(12) United States Patent
Kubo et al.

(10) Patent No.: US 9,977,306 B2
(45) Date of Patent: May 22, 2018

(54) ELECTROCHROMIC DEVICE, OPTICAL FILTER, LENS UNIT, AND IMAGING APPARATUS

(71) Applicant: CANON KABUSHIKI KAISHA, Tokyo (JP)

(72) Inventors: Wataru Kubo, Inagi (JP); Shinjiro Okada, Kamakura (JP); Kenji Yamada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/102,248

(22) PCT Filed: Dec. 8, 2014

(86) PCT No.: PCT/JP2014/083063
§ 371 (c)(1),
(2) Date: Jun. 6, 2016

(87) PCT Pub. No.: WO2015/088033
PCT Pub. Date: Jun. 18, 2015

(65) Prior Publication Data
US 2016/0299401 A1    Oct. 13, 2016

(30) Foreign Application Priority Data

Dec. 13, 2013 (JP) .................................. 2013-258422
Oct. 28, 2014 (JP) .................................. 2014-219767

(51) Int. Cl.
*G02F 1/15* (2006.01)
*G02F 1/153* (2006.01)
(Continued)

(52) U.S. Cl.
CPC .............. *G02F 1/1521* (2013.01); *G02F 1/15* (2013.01); *G02F 1/163* (2013.01); *G09G 3/38* (2013.01);
(Continued)

(58) Field of Classification Search
CPC .......... G02F 1/15; G02F 1/1521; G02F 1/153; G02F 1/157; G02F 1/163;
(Continued)

(56) References Cited

U.S. PATENT DOCUMENTS 5,086,351 A * 2/1992 Couput ................. G02F 1/1525
204/192.1
5,274,493 A * 12/1993 Couput ................. G02F 1/1523
204/192.1
(Continued)

FOREIGN PATENT DOCUMENTS

JP    2001-519922 A    10/2001
JP    2005-091788 A    4/2005
(Continued)

*Primary Examiner* — Loha Ben
(74) *Attorney, Agent, or Firm* — Canon U.S.A., Inc. IP Division

(57) ABSTRACT

The present invention provides an electrochromic device including a pair of electrodes and an electrochromic layer disposed between the pair of electrodes and containing different electrochromic materials having the same polarity, wherein in the case where two materials are selected from the different electrochromic materials having the same polarity in descending order of maximum absorbance in a color-display mode of the electrochromic layer and where the diffusion coefficients of the molecules of the two materials are compared with each other in the color-display mode, a smaller diffusion coefficient $D_2 min$, a larger diffusion coefficient $D_2 max$, and maximum absorbance $H_2$ of the molecules of the electrochromic material having the diffusion coefficient $D_2 max$ in the color-display mode satisfy Formula (5).

$$1 \leq D_2 max / D_2 min \leq (1+0.146/H_2)^2 \quad (5)$$

22 Claims, 9 Drawing Sheets

(51) Int. Cl.
    *G09G 3/38*       (2006.01)
    *H04N 5/238*      (2006.01)
    *G02F 1/163*      (2006.01)
    *G02F 1/157*      (2006.01)
(52) U.S. Cl.
    CPC ............ *H04N 5/238* (2013.01); *G02F 1/157* (2013.01); *G02F 2001/1515* (2013.01); *G02F 2001/1635* (2013.01)
(58) Field of Classification Search
    CPC ..... G02F 2001/1515; G02F 2001/1635; G02F 2203/12; G02F 2203/34; G09G 3/38; H04N 5/238; C09K 9/00
    USPC ........... 359/265, 273, 275, 599; 345/84, 105
    See application file for complete search history.

(56) References Cited

U.S. PATENT DOCUMENTS

| 6,020,987 A | 2/2000 | Baumann |
| 2003/0053187 A1 | 3/2003 | Roberts |

FOREIGN PATENT DOCUMENTS

| JP | 2005-517978 A | 6/2005 |
| JP | 2012-098628 A | 5/2012 |
| JP | 6012689 B2 | 10/2016 |

* cited by examiner

ELECTROCHROMIC DEVICE, OPTICAL FILTER, LENS UNIT, AND IMAGING APPARATUS

TECHNICAL FIELD

The present invention relates to an electrochromic device, an optical filter, a lens unit, and an imaging apparatus.

BACKGROUND ART

Electrochromic devices use electrochromic materials of which the optical absorption properties (such as absorption wavelength and absorbance) are changed through an electrochemical redox reaction and are applied to, for example, display apparatuses, variable-reflectance mirrors, and variable transmission windows.

Such electrochromic devices include organic electrochromic devices, and PTL 1 discloses an organic electrochromic device having an organic electrochromic layer that is a layer of a solution in which organic low-molecular-weight electrochromic materials having different absorption wavelengths have been dissolved in a solvent. The organic electrochromic device disclosed in PTL 1, however, has some regions in which a color balance changes in a color-display mode because the molecules of the electrochromic materials in the organic electrochromic layer have different diffusion coefficients.

Such a change in a color balance is inadequate when the organic electrochromic device is used as, for example, a unit for adjusting the amount of light in an imaging apparatus [e.g., neutral density (ND) filter] or as a color filter in a display apparatus and therefore needs to be reduced.

CITATION LIST

Patent Literature

PTL 1 U.S. Pat. No. 6,020,987

SUMMARY OF INVENTION

An aspect of the present invention provides an electrochromic device including a pair of electrodes and an electrochromic layer disposed between the pair of electrodes and containing different electrochromic materials having the same polarity, wherein in the case where two materials are selected from the different electrochromic materials having the same polarity in descending order of maximum absorbance in a color-display mode of the electrochromic layer and where the diffusion coefficients of the molecules of the two materials are compared with each other in the color-display mode, a smaller diffusion coefficient $D_2\text{min}$, a larger diffusion coefficient $D_2\text{max}$, and maximum absorbance $H_2$ of the molecules of the electrochromic material having the diffusion coefficient $D_2\text{max}$ in the color-display mode satisfy Formula (5).

$$1 \leq D_2\text{max}/D_2\text{min} \leq (1+0.146/H_2)^2 \tag{5}$$

Another aspect of the present invention provides an electrochromic device including a pair of electrodes and an electrochromic layer disposed between the pair of electrodes and containing different electrochromic materials having the same polarity, wherein, in the case where three materials are selected from the different electrochromic materials having the same polarity in descending order of maximum absorbance in a color-display mode of the electrochromic layer and where the diffusion coefficients of the molecules of the three materials are compared with each other in the color-display mode, a smaller diffusion coefficient $D_3\text{min}$ and a larger diffusion coefficient $D_3\text{max}$ and maximum absorbance $H_3$ satisfy Formula (5a).

$$1 \leq D_3\text{max}/D_3\text{min} \leq 1.29 \tag{5a}$$

Another aspect of the present invention provides an electrochromic device including a pair of electrodes and an electrochromic layer disposed between the pair of electrodes and containing different electrochromic materials having the same polarity, wherein, in the case where a material of which the molecules have the largest maximum absorbance and any one of materials of which the molecules have maximum absorbance that is at least one-tenth of the maximum absorbance of the molecules having the largest maximum absorbance are selected from the different electrochromic materials having the same polarity in a color-display mode of the electrochromic layer and where the diffusion coefficients of the molecules of the selected materials are compared with each other, a smaller diffusion coefficient $D_N\text{min}$, a larger diffusion coefficient $D_N\text{max}$, and maximum absorbance $H_N$ of the molecules having the diffusion coefficient $D_N\text{max}$ in the color-display mode satisfy Formula (5b).

$$1 \leq D_N\text{max}/D_N\text{min} \leq (1+0.146/H_N)^2 \tag{5b}$$

Further features of the present invention will become apparent from the following description of exemplary embodiments with reference to the attached drawings.

DESCRIPTION OF EMBODIMENT

A diffusion process in substance transport on which an organic electrochromic device of this embodiment is based will now be described. The term "electrochromic" is also referred to as "EC".

In the so-called Type-I electrochromic device in which an electrochromic layer is composed of a solution of an electrochromic material in a solvent, a potential difference that is enough to promote an oxidation reaction or reduction reaction for coloring of the electrochromic material is applied between its electrodes in a color-display mode. In a coloring process, the substance transport in which the molecules of an uncolored electrochromic material move to an electrode is rate-limiting. An electrolytic current generated by the substance transport to an electrode in the solution without an external factor, such as stirring, can be represented by the following Cottrell equation.

[Math. 1]

$$i(t) = nFcA\sqrt{\frac{D}{\pi t}} \quad (1)$$

In the equation, i(t) represents an electrolytic current, n represents the number of electrons involved in a unimolecular reaction, F represents the Faraday constant, c represents the bulk concentration of EC molecules (in other words, the initial solution concentration), A represents an electrode surface area, D represents a diffusion coefficient, and t represents time.

Electric charge Q(t) provided by time integration thereof is given by the following equation.

[Math. 2]

$$Q(t) = 2nFAc\sqrt{\frac{Dt}{\pi}} \quad (2)$$

In the case where the solution contains different electrochromic materials n and m, the ratio of the absorbance of one material to that of the other material $[Abs_n(t)/Abs_m(t)]$ is given by the following equation.

[Math. 3]

$$\frac{Abs_n(t)}{Abs_m(t)} = \frac{\varepsilon_n l \frac{Q_n(t)}{nF}}{\varepsilon_m l \frac{Q_m(t)}{nF}} = \frac{2\varepsilon_n A c_n \sqrt{\frac{D_n t}{\pi}}}{2\varepsilon_m A c_m \sqrt{\frac{D_m t}{\pi}}} = \frac{\varepsilon_n c_n \sqrt{D_n}}{\varepsilon_m c_m \sqrt{D_m}} \quad (3)$$

In this equation, ε represents a molar absorption coefficient of the molecules of a colored electrochromic material, and l represents an optical path length.

The equation shows that the absorbance ratio is not changed by time. In addition, the differences in a diffusion coefficient and molar absorption coefficient between the materials can be compensated by bulk concentration.

Figure 1:
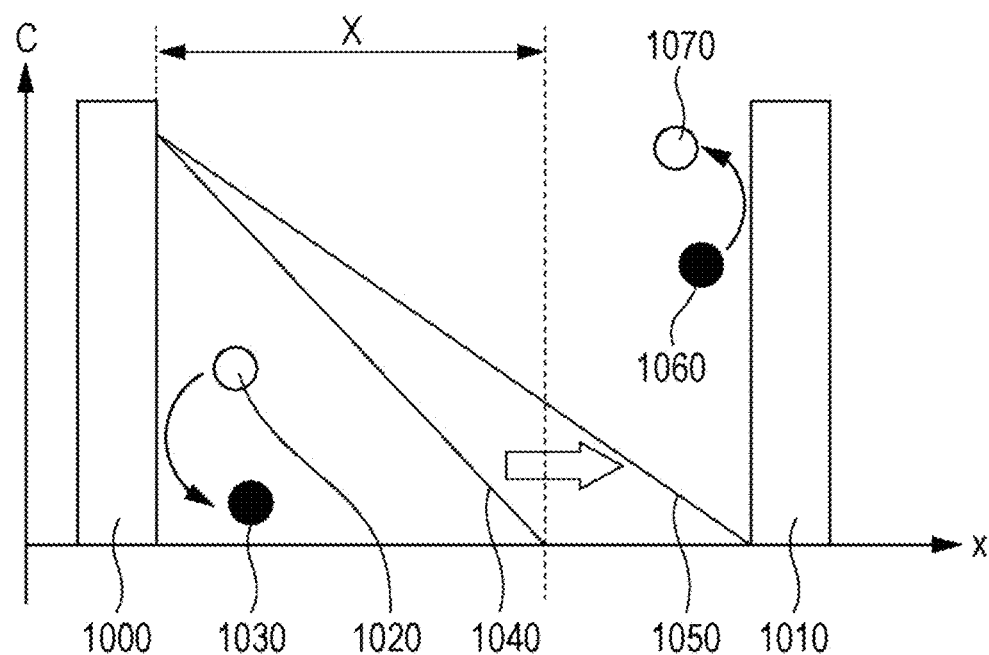
FIG. 1 schematically illustrates the mechanism of coloring in a thin-layer cell of an electrochromic device.

FIG. 1 illustrates the mechanism of coloring in an organic electrochromic device having a thin electrochromic layer. In FIG. 1, the vertical axis (c) represents the concentration of the molecules of a colored electrochromic material, and the horizontal axis (x) represents the distance from an electrode to which an electric potential necessary for a coloring reaction is applied. A symbol 1000 represents the electrode for carrying out the coloring reaction of the molecules of an electrochromic material, and a symbol 1010 represents a counter electrode thereof.

In FIG. 1, a molecule 1020 of an uncolored electrochromic material is converted into a molecule 1030 of a colored electrochromic material by applying an electric potential necessary for the coloring reaction to the electrode 1000. This phenomenon generates concentration distribution of the molecules of the colored electrochromic material in the organic electrochromic layer, and the concentration distribution is shown by a concentration profile represented by a symbol 1040. In a region shown in the concentration profile, a mechanism in which different electrochromic materials used in the electrochromic device are colored at a certain rate effectively works, and the color balance in the electrochromic device does not change over time.

In the thin electrochromic layer, however, in the case where a diffusion layer of the molecules of the colored electrochromic material, which is represented by a symbol X, reaches the counter electrode into a concentration profile represented by a symbol 1050, a reaction in which a molecule 1060 of the colored electrochromic material is converted into a molecule 1070 of an uncolored electrochromic material is caused because the counter electrode has an electric potential which enables a reaction opposite to the reaction caused by the electrode 1000. Hence, after the diffusion layer of the molecules reaches the counter electrode, the concentration of the colored material does not change in the cell as a whole; or even when a change occurs, the degree of an increase in the concentration is small.

In the case where the molecules of different electrochromic materials having the same polarity (molecules of different anodic electrochromic materials or molecules of different cathodic electrochromic materials) coexist in the electrochromic layer, the timing at which the diffusion layer of the molecules of one material reaches the counter electrode is different from that of the diffusion layer of the molecules of another material.

It is presumed that the thickness of a diffusion layer [δ(t)] in an electrochemical reaction is in proportion to the square root of the product of a diffusion coefficient and time as represented by Equation (4).

[Math. 4]

$$\delta(t) = 2\sqrt{Dt} \quad (4)$$

As is clear from Equation (4), in the case where different electrochromic materials having the same polarity are present in the organic electrochromic layer, times taken for the diffusion layers of colored materials (colored electrochromic materials) to reach the counter electrode are different from each other, which results in a change in a color balance.

On the basis of this mechanism, the electrochromic device of the embodiment will now be described.

The electrochromic device of the embodiment includes a pair of electrodes and an electrochromic layer disposed between the pair of electrodes and containing different electrochromic materials having the same polarity, wherein in the case where two materials are selected from the different electrochromic materials having the same polarity in descending order of maximum absorbance in a color-display mode of the electrochromic layer and where the diffusion coefficients of the molecules of the two materials are compared with each other in the color-display mode, a smaller diffusion coefficient $D_2min$, a larger diffusion coefficient $D_2max$, and maximum absorbance $H_2$ of the molecules of the electrochromic material having the diffusion coefficient $D_2max$ in the color-display mode satisfy Formula (5).

$$1 \leq D_2max/D_2min \leq (1+0.146/H_2)^2 \quad (5)$$

Figure 2:
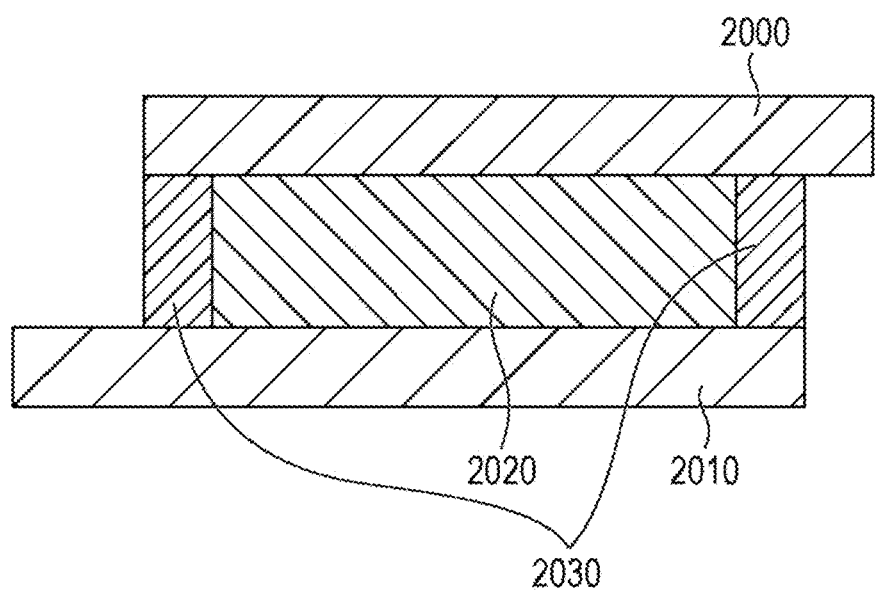
FIG. 2 is a schematic cross-sectional view illustrating an electrochromic (EC) device according to an embodiment.

FIG. 2 is a schematic cross-sectional view illustrating the organic electrochromic device of the embodiment.

In FIG. 2, symbols 2000 and 2010 represent electrodes, and a symbol 2020 represents an organic electrochromic layer disposed therebetween. The organic electrochromic layer 2020 is held by a sealing member 2030 so as to be isolated from the outside.

Each component of the organic electrochromic device of the embodiment will now be described.

Electrode

One of the pair of electrodes (2000 and 2010) of the organic electrochromic device of the embodiment can be a transparent electrode.

The term "transparent" refers to a property that enables light to be transmitted, and light transmittance can be in the range of 50% to 100%. This is because using a transparent electrode as at least one of the electrodes has the following effect: light can be efficiently taken from the outside of the organic electrochromic device to interact with the electrochromic molecules, and thus the optical properties of the electrochromic molecules can affect light to be emitted. In this case, light to be transmitted is light that is in a wavelength region which the electrochromic device covers. For instance, in the case where the electrochromic device is used as the filter of an imaging apparatus in a visible light region, the light to be transmitted is visible light; in the case where the electrochromic device is used as the filter of an imaging apparatus in an infrared region, the light to be transmitted is infrared light.

Such a transparent electrode can be a transparent conductive oxide electrode in which a layer of transparent conductive oxide has been formed on a substrate of glass or a high molecular compound. Examples of the transparent conductive oxide include tin-doped indium oxide (ITO), zinc oxide, gallium-doped zinc oxide (GZO), aluminum-doped zinc oxide (AZO), tin oxide, antimony-doped tin oxide (ATO), fluorine-doped tin oxide (FTO), and niobium-doped titanium oxide (TNO). In particular, the layer of a transparent conductive oxide can be an FTO or ITO layer having a thickness ranging from 10 nm to 10000 nm. This is because both high light transmission and chemical stability can be satisfied.

The layer of transparent conductive oxide may have a multilayer structure including sublayers of transparent conductive oxides. This structure is likely to enhance conductivity and transparency.

The other one of the electrodes is selected so as to be suitable for application of the EC device. In the case where the organic electrochromic device of the embodiment is used as, for instance, a transmissive electrochromic device, the other electrode is preferably also a transparent electrode, and more preferably the above-mentioned transparent conductive oxide electrode.

In the case where the organic electrochromic device of the embodiment is used as a reflective electrochromic device, the other electrode can be an electrode which can reflect incident light.

Whichever the organic electrochromic device of the embodiment is, the materials used for the pair of electrodes can be materials which can be stably present in operating environment of the organic electrochromic device and which can promptly promote a redox reaction in response to application of voltage from the outside.

The organic electrochromic device of the embodiment may optionally include an additional electrode other than the pair of electrodes. The organic electrochromic device may, for example, include a reference electrode to obtain information about the electric potential of the organic electrochromic layer. Furthermore, for instance, one or both of the pair of electrodes may be composed of multiple electrodes for separate coloring.

The pair of electrodes (2000 and 2010) are attached to each other by the sealing member 2030 in a state in which the electrode surfaces face each other.

The sealing member 2030 can be formed of a material having the following characteristics: being chemically stable, not transmitting gas and liquid, and not inhibiting the redox reaction of the electrochromic materials. Examples of usable materials include inorganic materials such as glass frit, organic materials such as an epoxy resin, and metals. The sealing member 2030 may serve for maintaining the distance between the pair of electrodes. In the case where the sealing member 2030 does not work for defining the distance between the pair of electrodes, a spacer may be additionally disposed to maintain the distance therebetween. In such a case, the material of the spacer can be an inorganic material, such as silica beads or a glass fiber, or an organic material such as polyimide, polytetrafluoroethylene, fluororubber, or an epoxy resin. The spacer enables the distance between the electrodes of the EC device to be defined and maintained.

The distance between the pair of electrodes can be in the range of 0.6 μm to 130 μm. A distance of not less than 0.6 μm between the electrodes enables formation of a space in which an electrochromic material can be placed in an amount that is enough for the organic electrochromic device to effectively work. A distance of not more than 130 μm between the electrodes can give a high response speed. This is because the distance of not more than 130 μm enables the effect of substance transport by diffusion to be larger than the effect of substance transport by free convection.

In particular, the distance of not less than 0.6 μm is determined from the following calculation.

Absorbance increases in response to the concentration of the molecules of a colored electrochromic material, the molar absorption coefficient thereof, and optical path length (distance between the pair of electrodes in this case) according to the Lambert-Beer law. Hence, the minimum distance between the electrodes is determined by the absorbance necessary for the electrochromic device, the solubility of the molecules of the colored electrochromic material in a solvent, and the molar absorption coefficient. In estimation of the necessary distance between the electrodes, assuming that the necessary absorbance is 0.3 (transmittance: 50%), that the molar absorption coefficient is $4 \times 10^4$ $M^{-1}cm^{-1}$, that the concentration of the molecules of an uncolored material is 0.25 M, and that the coloring rate of the electrochromic material is 50%, the distance between the electrodes is 0.6 μm.

The distance of not more than 130 μm is specifically determined from the following calculation.

In the case where the distance between the electrodes is estimated on the basis of the time taken for the absorbance to reach the maximum [the time corresponds to the start time in a domain (iii) in the below description of diffusion coefficient] and the assumption that the diffusion coefficient of the molecules of an electrochromic material is $1.7 \times 10^{-6}$ $cm^2 s^{-1}$ and that the time is 20 seconds, the distance between the electrodes is 130 μm.

A small distance between the electrodes can be employed in terms of a reduction in substance transport by convection and a resulting increase in a response speed. A large distance between the electrodes can be employed in view of the selectivity of an electrochromic material (a variety of employable absorbance and solubility) and formation of a filter having a higher absorbance (small light transmittance). In particular, the distance is preferably in the range of 2 μm (corresponding to a light transmittance of 10%) to 120 μm, and most preferably 4 μm (corresponding to a light transmittance of 1%) to 100 μm.

Electrochromic Layer

The electrochromic device of the embodiment includes the electrochromic layer which is disposed between the pair of electrodes and which contains a composition composed of different electrochromic materials having the same polarity.

The term "different electrochromic materials" refers to electrochromic materials having different chemical structures.

A solvent used in the composition containing different electrochromic materials having the same polarity is selected depending on the intended use in view of the solubility, vapor pressure, viscosity, and potential window of solutes including the electrochromic materials and can be a polar solvent. Specific examples of the solvent includes water and organic polar solvents such as methanol, ethanol, propylene carbonate, ethylene carbonate, dimethyl sulfoxide, dimethoxyethane, γ-butyrolactone, γ-valerolactone, sulfolane, dimethylformamide, dimethoxyethane, tetrahydrofuran, acetonitrile, propionitrile, benzonitrile, dimethylacetamide, methylpyrrolidinone, and dioxolane.

In addition to the solvent and the different electrochromic materials having the same polarity, a polymer or a gelling agent can be added to the composition to convert the composition into a highly viscous composition or a gel composition. Examples of the polymer include, but are not limited to, polyacrylonitrile, carboxymethylcellulose, polyvinyl chloride, polyethylene oxide, polypropylene oxide, polyurethane, polyacrylate, polymethacrylate, polyamide, polyacrylamide, polyester, and Nafion (trade name).

The different electrochromic materials having the same polarity, which is contained in the electrochromic composition, are anodic electrochromic materials or cathodic electrochromic materials. The electrochromic composition may contain electrochromic materials having opposite polarities provided that different anodic electrochromic materials or cathodic electrochromic materials are used.

The term "anodic electrochromic material" refers to a material that causes a color change through an oxidation reaction in which electrons are removed from the molecules thereof; inversely, the term "cathodic electrochromic material" refers to a material that causes a color change through a reduction reaction in which electrons are imparted to the molecules. The term "materials having the same polarity" refers to a combination of an anodic electrochromic material and another anodic electrochromic material or a combination of a cathodic electrochromic material and another cathodic electrochromic material.

Examples of the anodic electrochromic materials include thiophene derivatives, aromatic amine compounds, such as phenazine derivatives and triarylamine derivatives, pyrrole derivatives, thiazine derivatives, triarylmethane derivatives, bisphenylmethane derivatives, ferrocene derivatives, xanthene derivatives, fluoran derivatives, and spiropyran derivatives. Among these, low-molecular weight thiophene derivatives, such as monothiophene derivatives, origothiophene derivatives, and thienoacene derivatives, and low-molecular weight aromatic amine compounds, such as phenazine derivatives and triarylamine derivatives, can be employed as preferable anodic electrochromic materials.

This is because using such materials in the electrochromic layer is likely to enable production of an electrochromic device which shows a desired profile of an absorption wavelength.

These molecules, in their neutral states, have absorption peaks in an ultraviolet region, exhibit no absorption in a visible light region, and can be in a colorless state in which light transmittance in a visible light region is high. These molecules are converted into a radical cation through an oxidation reaction, and its absorption shifts to a visible light region, thereby giving a colored state. In these molecules, the absorption wavelength thereof can be adjusted by increasing or decreasing the π-conjugation length or by changing the π-conjugated system thorough replacing a substituent group.

The term "low-molecular weight" refers to a molecule having a molecular weight of less than 2000, and preferably 1000; and the term "oligothiophene" refers to oligothiophene having two to nine thiophene rings per molecule, and preferably two to five thiophene rings. Thienoacene is a polycyclic fused compound such as thienothiophene or dithienothiophene.

Examples of the substituent groups of the monothiophene derivatives, oligothiophene derivatives, and thienoacene derivatives include, but are not limited to, alkyl groups having 1 to 20 carbon atoms, alkoxy groups having 1 to 20 carbon atoms, alkyl ester groups having 1 to 20 carbon atoms, optionally substituted aryl groups, optionally substituted amino groups, and cyano groups.

The monothiophene derivatives, oligothiophene derivatives, and thienoacene derivatives are not particularly limited but can be compounds represented by General Formula (S). Such monothiophene derivatives, oligothiophene derivatives, and thienoacene derivatives can be present as a chromophore in the organic electrochromic layer.

[Chem. 1]

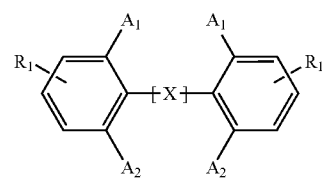

(S)

In General Formula (S), $A_1$ and $A_2$ are each independently selected from a hydrogen atom, an alkyl group having 1 to 20 carbon atoms, an alkoxy group having 1 to 20 carbon atoms, and an optionally substituted aryl group. At least any one of $A_1$ and $A_2$ is an alkyl group, an alkoxy group, or an aryl group. $R_1$ represents a hydrogen atom, a halogen atom, an alkyl group having 1 to 20 carbon atoms, an alkoxy group having 1 to 20 carbon atoms, an alkyl ester group having 1 to 20 carbon atom, an aryl group having 1 to 4 carbon atoms and optionally substituted with an alkyl group, an optionally substituted amino group, or a cyano group. X is selected from structures represented by General Formulae (a), (b), (c), and (d) such that the number of the thiophene rings is from one to five, and these structures are bonded at positions *1 to *4 to other structures or the benzene rings positioned at the ends of the structure represented by General Formula (S).

[Chem. 2]

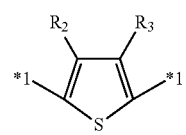

(a)

In General Formula (a), $R_2$ and $R_3$ are each independently selected from a hydrogen atom, a halogen atom, an alkyl group having 1 to 20 carbon atoms, an alkoxy group having 1 to 20 carbon atoms, an optionally substituted aryl group, an alkyl ester group having 1 to 20 carbon atoms, an optionally substituted amino group, and a cyano group. *1 represents positions at which this structure is bonded to the benzene rings positioned at the ends of the structure represented by General Formula (S) or to other structures represented by General Formula (a), (b), (c), or (d).

[Chem. 3]

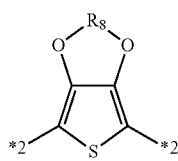

(b)

In General Formula (b), $R_8$ represents an optionally branched alkylene group having 1 to 20 carbon atoms. *2 represents positions at which this structure is bonded to the benzene rings positioned at the ends of the structure represented by General Formula (S) or to other structures represented by General Formula (a), (b), (c), or (d).

[Chem. 4]

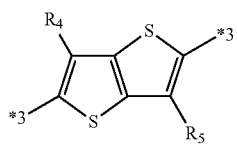

(c)

In General Formula (c), $R_4$ and $R_5$ are each independently selected from a hydrogen atom, a halogen atom, an alkyl group having 1 to 20 carbon atoms, an alkoxy group having 1 to 20 carbon atoms, an optionally substituted aryl group, an alkyl ester group having 1 to 20 carbon atoms, an optionally substituted amino group, and a cyano group. *3 represents positions at which this structure is bonded to the benzene rings positioned at the ends of the structure represented by General Formula (S) or to other structures represented by General Formula (a), (b), (c), or (d).

[Chem. 5]

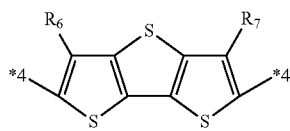

(d)

In General Formula (d), $R_6$ and $R_7$ are each independently selected from a hydrogen atom, a halogen atom, an alkyl group having 1 to 20 carbon atoms, an alkoxy group having 1 to 20 carbon atoms, an optionally substituted aryl group, an alkyl ester group having 1 to 20 carbon atoms, an optionally substituted amino group, and a cyano group. *4 represents positions at which this structure is bonded to the benzene rings positioned at the ends of the structure represented by General Formula (S) or to other structures represented by General Formula (a), (b), (c), or (d).

In the structure represented by General Formula (S), the order in which the structures represented by General Formula (a) to (d) are bonded is not limited to the order of (a) to (d). The number of thiophene rings is the number of thiophene ring moieties; in particular, in a structure in which A thiophene rings are fused to each other, the number of the thiophene rings is counted as A. Hence, the number of the thiophene rings is one in each of General Formulae (a) and (b), two in General Formula (c), and three in General Formula (d).

In the structure represented by General Formula (S), an aryl group may be substituted with an alkyl group having 1 to 4 carbon atoms or an alkoxy group having 1 to 4 carbon atoms.

The structure represented by General Formula (S) has a moiety which is the core that serves for light absorption and which has the thiophene skeleton (core moiety) and a moiety consisting of phenyl groups introduced to the core moiety and having substituent groups at the ortho positions with respect to the core moiety (cage moiety). Such a structure enables the core moiety that generates a radical cation to be protected owing to steric effects caused by the substituent groups ($A_1$ and $A_2$) at the ortho positions of the phenyl groups in the cage moiety.

The instability of the radical cations is, for example, brought about by recombination of radicals due to high reactivity of the radicals or by extraction of a hydrogen atom from other molecules by radicals. In other words, the instability of the radical cations is attributed to the reaction of radicals which have contacted other molecules. Hence, the steric effects caused by the substituent groups ($A_1$ and $A_2$) at the ortho positions of the phenyl groups bonded to the core moiety reduce the contact of the core moiety with another molecule, which leads to an enhancement in the stability of the radical cation of the core moiety.

The structure of each phenyl group (cage moiety) having the sterically hindering groups $A_1$ and $A_2$ serves for protecting the moiety to be oxidized for color change (core moiety) from interference by substances which are present in the form of other electrochromic materials or impurities; hence, the structure suitably has a molecular shape that enables the core moiety to be surrounded. Thus, the substituent groups to be introduced to each phenyl group, namely $A_1$ and $A_2$, are desirably bulky.

Examples of the cathodic electrochromic materials include pyridine derivatives, such as viologen derivatives, and quinone compounds.

The electrochromic layer may optionally contain a supporting electrolyte. The electrolyte is not particularly limited provided that the following requirements are satisfied: being an ionically dissociable salt, being well soluble in a solvent, having a high compatibility in the case of a solid electrolyte, and being stable to an electric potential in which the electrochromic device operates. A variety of cations or anions can be used in proper combination as the supporting electrolyte. Examples of the cations include a variety of alkali metal ions, alkaline earth metal ions, and quaternary ammonium ions. Specific examples thereof include ions of Li, Na, K, Ca, Ba, tetramethylammonium, tetraethylammonium, and tetrabutylammonium. Examples of the anions include anions of a variety of fluorine compounds and halogenide ions. Specific examples thereof include $ClO_4^-$, $SCN^-$, $BF_4^-$, $AsF_6^-$, $CF_3SO_3^-$, $CF_3SO_2NSO_2CF_3^-$, $PF_6^-$, $I^-$, $Br^-$, and $Cl^-$.

The electrochromic layer can be formed by, for example, forming an opening in part of the pair of electrodes or sealing member; attaching them to each other; injecting the electrochromic composition through the opening by vacuum injection, atmospheric injection, a meniscus method, or another technique; and confining the electrochromic composition.

Diffusion Coefficient

In the organic electrochromic device of the embodiment, two materials are selected from the different electrochromic materials having the same polarity, which are contained in the electrochromic layer, in descending order of maximum absorbance in the color-display mode of the electrochromic layer; the diffusion coefficients of the molecules of the two materials in the color-display mode of the electrochromic layer are compared with each other to define the smaller one as $D_2$min and the larger one as $D_2$max; and the diffusion coefficients $D_2$min and $D_2$max and maximum absorbance $H_2$ of the molecules having the diffusion coefficient $D_2$max in the color-display mode of the electrochromic layer satisfy Formula (5).

$$1 \leq D_2\text{max}/D_2\text{min} \leq (1+0.146/H_2)^2 \quad (5)$$

The term "maximum absorbance" herein refers to the largest absorbance in the maximum absorption wavelengths of electrochromic molecules and are normally the maximum absorbance in a wavelength region which the electrochromic device covers. For instance, in the case where an electrochromic device is used as the filter of an imaging apparatus which operates in a visible light region, the maximum absorbance is in the visible light region; in the case where an electrochromic device is used as the filter of an imaging apparatus which operates in an infrared region, the maximum absorbance is in the infrared region.

The molecules A and B herein selected are electrochromic molecules having the same polarity (anodic electrochromic molecules and different anodic electrochromic molecules or cathodic electrochromic molecules and different cathodic electrochromic molecules).

The combination of the molecules of two electrochromic materials selected from the different electrochromic materials in descending order of maximum absorbance in the color-display mode of the electrochromic layer is defined as (X and Y). The diffusion coefficients of the molecules X and Y are defined as $D_X$ and $D_Y$ ($D_X \geq D_Y$), respectively. In this case, since the combination of the molecules of two materials selected in descending order of maximum absorbance is (X and Y), the maximum absorbance of the molecules X may be larger than that of the molecules Y, the maximum absorbance of the molecules Y may be larger than that of the molecules X, or the maximum absorbance of the molecules X may be equal to that of the molecules Y.

In the case where a voltage that is enough to cause an electrode reaction is applied to the electrochromic device, the time dependence of the initial number of reacting molecules $N(t)$ can be defined by Equation (6) on the basis of Equation (2).

[Math. 5]

$$N(t) = 2Ac\sqrt{\frac{Dt}{\pi}} \quad (6)$$

N and $N_{max}$ in the electrochromic device that is in the maximum color-display mode can be given by Equation (7).

[Math. 6]

$$N_{max} = \frac{1}{2}Acd \quad (7)$$

In the case where the organic electrochromic device is a unipolar electrochromic device (device of which the organic electrochromic layer contains only anodic electrochromic molecules or cathodic electrochromic molecules), d represents the distance between a pair of electrodes.

In the case where the organic electrochromic device is a complementary electrochromic device (electrochromic device of which the organic electrochromic layer contains both anodic electrochromic molecules and cathodic electrochromic molecules), d for the molecules of different anodic electrochromic materials is the distance from the anode to the plane of decoloring reactions of the molecules of a colored anodic electrochromic material and the molecules of a colored cathodic electrochromic material. Likewise, d for the molecules of different cathodic electrochromic materials is the distance from the cathode to the plane of decoloring reactions of the molecules of a colored cathodic electrochromic material and the molecules of a colored anodic electrochromic material.

A unipolar electrochromic device will be described below; however, the same logic holds true for a complementary electrochromic device when the complementary electrochromic device is regarded as two electrochromic devices in which the counter electrode serves as the plane of decoloring reactions of the molecules of a colored anodic electrochromic material and the molecules of a colored cathodic electrochromic material.

The amounts of the radical molecules X and Y in the electrochromic layer can be analyzed in the following three domains (i) to (iii).

(i) Before the diffusion layers of both the molecules X and Y of colored electrochromic materials reach the counter electrode ($t < \pi d^2/16D_X$).

In this case, since the number of reacting molecules can be defined by Equation (6), the ratio of the absorbance of the molecules Y to the absorbance of the molecules X [Abs(Y)/Abs(X)] can be defined as follows.

[Math. 7]

$$\frac{Abs(Y)}{Abs(X)} = \frac{\varepsilon_Y c_Y \sqrt{D_Y}}{\varepsilon_X c_X \sqrt{D_X}} \quad (8)$$

From Equation (8), in the case where the electrochromic device is used only in the domain (i), the effects of differences in a molar absorption coefficient and in a diffusion coefficient on a color balance can be controlled by the initial concentration.

(ii) After the diffusion layer of the molecules X of the colored electrochromic material reaches the counter electrode but before the diffusion layer of the molecules Y of the colored electrochromic material reaches the counter electrode ($\pi d^2/16D_X \leq t < \pi d^2/16D_Y$).

In this case, the number of reacting molecules Y continues to increase according to Equation (6), whereas the number of reacting molecules X does not change according to Equation (7); accordingly, the color balance changes.

(iii) After the diffusion layers of both the molecules X and Y of the colored electrochromic materials reach the counter electrode ($t \geq \pi d^2/16D_Y$).

In the case where the initial concentration is determined so as to keep the color balance in the domain (i), the change in the color balance becomes the largest in the domain (iii). In the domain (iii), the ratio of the absorbance of the molecules Y to the absorbance of the molecules X [Abs(Y)/Abs(X)] and the ratio of the transmittance of the molecules Y to the transmittance of the molecules X [T(Y)/T(X)] are defined as follows on the basis of Equation (7).

[Math. 8]

$$\frac{\text{Abs}(Y)}{\text{Abs}(X)} = \frac{\varepsilon_Y c_Y}{\varepsilon_X c_X} \quad (9)$$

[Math. 9]

$$\frac{T(Y)}{T(X)} = 10^{\frac{d}{2}(\varepsilon_X c_X - \varepsilon_Y c_Y)} \quad (10)$$

Since the initial concentration is generally determined to maintain the color balance in the domain (i), the differences in a diffusion coefficient and in a molar absorption coefficient are compensated with the initial concentration such that Equation (7) produces one. Thus, the following condition is introduced.

[Math. 10]

$$\varepsilon_X c_X \sqrt{D_X} = \varepsilon_Y c_Y \sqrt{D_X} \quad (11)$$

Substituting Equation (11) for Equation (10) produces Equation (12).

[Math. 11]

$$\frac{T(Y)}{T(X)} = 10^{\frac{d\varepsilon_X c_X}{2}\left(1-\sqrt{\frac{D_X}{D_Y}}\right)} \quad (12)$$

In Equation (12), the following part corresponds to the maximum absorbance of the molecules X on the basis of Equation (7) and the Lambert-Beer law.

$$\frac{d\varepsilon_X c_X}{2} \quad [\text{Math. 12}]$$

Replacing this part with $\text{Abs}_{max}$ leads Equation (12) to the following equation.

[Math. 13]

$$\frac{D_X}{D_Y} = \left(1 + \frac{1}{\text{Abs}_{max}}\log\frac{T(X)}{T(Y)}\right)^2 \quad (13)$$

In the case where the organic electrochromic device of the embodiment is used as a unit for adjusting the amount of light (e.g., ND filter) in an imaging apparatus in a visible light region, a variation in a transmittance ratio can be in the range of ±20%; in the case where the organic electrochromic device is used as an ND filter of higher performance, a variation in a transmittance ratio can be in the range of ±10%.

Figure 3:
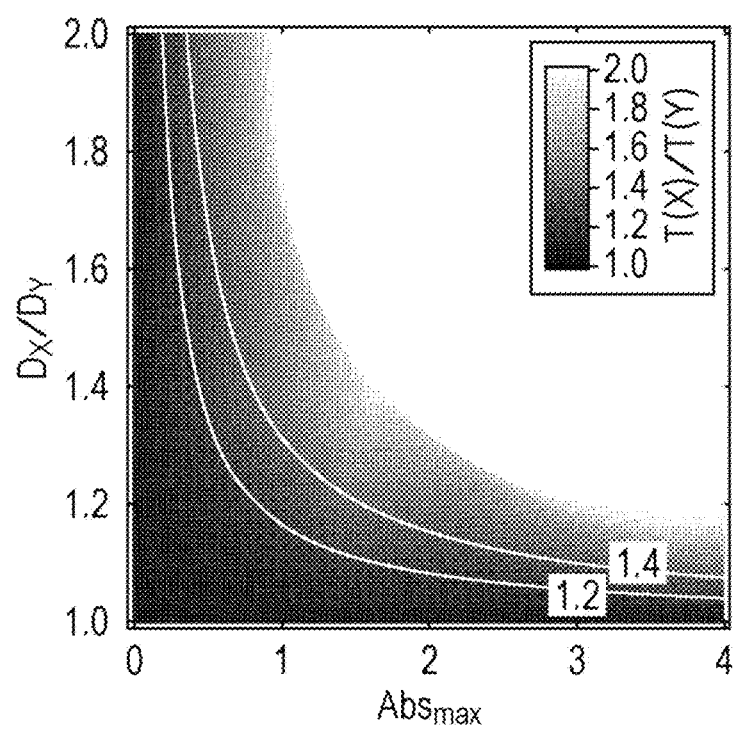
FIG. 3 illustrates the relationship between a diffusion coefficient ratio $(D_X/D_Y)$ and a transmittance ratio $[T(X)/T(Y)]$ at $\text{Abs}_{max}$.

FIG. 3 illustrates the relationship between a diffusion coefficient ratio ($D_X/D_Y$) and a transmittance ratio [T(X)/T(Y)] at $\text{Abs}_{max}$, the relationship being represented by Equation (13). In FIG. 3, the vertical axis represents a diffusion coefficient ratio ($D_X/D_Y$), the horizontal axis represents the maximum absorption ($\text{Abs}_{max}$) of the molecules X, and the black-and-white gradation represents a transmittance ratio [T(X)/T(Y)]. The region under the white line represented by a symbol 1.4 in FIG. 3 is a range in which a variation in a transmittance ratio in the electrochromic device is within ±20%, and the region under the white line represented by a symbol 1.2 in FIG. 3 is a range in which a variation in a transmittance ratio is within ±10%.

From Equation (13) and FIG. 3, in the case where the relationship in a diffusion coefficient between the molecules Y having a smaller diffusion coefficient [Dmin($D_Y$)] and the molecules X having a larger diffusion coefficient [Dmax ($D_X$)] and maximum absorbance H provided by the molecules having the diffusion coefficient Dmax satisfy Formula (5), transmittance represented by Formula (14) is provided, which shows a variation in a transmittance in the electrochromic device is small in this condition. In the case where Formula (15) is satisfied, the transmittance represented by Formula (16) is provided, which shows that a variation in a transmittance in the electrochromic device is smaller in this condition.

$$1 \leq D_2\text{max}/D_2\text{min} \leq (1+0.146/H_2) \quad (5)$$

$$T(X)/T(Y) \leq 1.4 \quad (14)$$

$$1 \leq D_2\text{max}/D_2\text{min} \leq (1+0.0792/H_2) \quad (15)$$

$$T(X)/T(Y) \leq 1.2 \quad (16)$$

The above description shows that a variation in the light transmittance of the electrochromic device is small in the case where the molecules X and Y of two materials satisfy the relationship represented by Formula (15), the two materials having a large effect on absorbance and being selected from materials contained in the electrochromic layer in descending order of maximum absorbance.

In the case where the electrochromic layer contains three or more different electrochromic materials having the same polarity, three electrochromic materials are selected from these different electrochromic materials having the same polarity in descending order of maximum absorbance in the color-display mode of the electrochromic layer. The diffusion coefficients of the molecules of the three materials are compared with each other to define the smallest one as Dy and the largest one as the Dx. The diffusion coefficients Dx and Dy and maximum absorbance H of the molecules having the diffusion coefficient Dx preferably satisfy Formula (5), and more preferably Formula (15).

In other words, in the electrochromic layer containing three or more different electrochromic materials having the same polarity, three materials are selected from these different electrochromic materials having the same polarity in descending order of maximum absorbance in the color display mode of the electrochromic layer; the diffusion coefficients of the molecules of the selected three materials in the color display mode of the electrochromic layer are compared with each other to define the smallest one as $D_3$min and the largest one as $D_3$max; and the diffusion coefficients $D_3$min and $D_3$max and maximum absorbance $H_3$ of the molecules having the diffusion coefficient $D_3$max in the color display mode preferably satisfy Formula (5a), and more preferably Formula (15a).

$$1 \leq D_3\text{max}/D_3\text{min} \leq (1+0.146/H_3)^2 \quad (5a)$$

$$1 \leq D_3\text{max}/D_3\text{min} \leq (1+0.0792/H_3) \quad (15a)$$

Furthermore, in the color-display mode of the electrochromic layer, a material of which the molecules have the largest maximum absorbance is selected from different electrochromic materials having the same polarity and contained in the electrochromic layer, and any one of materials of which the molecules have a maximum absorbance that is at least one-tenth of the maximum absorbance of the molecules having the largest maximum absorbance is also selected therefrom. The diffusion coefficients of the molecules of the selected materials are compared with each other to define the smaller one as Dy and the larger one as Dx. The diffusion coefficients Dx and Dy and maximum absorbance H of the molecules having the diffusion coefficient Dx in the color-display mode preferably satisfy Formula (5), and more preferably Formula (15).

In other words, a material of which the molecules have the largest maximum absorbance is selected from different electrochromic materials having the same polarity and contained in the electrochromic layer, and any one of materials of which the molecules have a maximum absorbance that is at least one-tenth of the maximum absorbance of the molecules having the largest maximum absorbance is also selected therefrom. The diffusion coefficients of the molecules of the selected materials are compared with each other to define the smaller one as $D_N$min and the larger one as $D_N$max; and the diffusion coefficients $D_N$min and $D_N$max and the maximum absorbance $H_N$ of the molecules having the diffusion coefficient $D_N$max in the color-display mode preferably satisfy Formula (5b), and more preferably Formula (15b).

$$1 \leq D_N\text{max}/D_N\text{min} \leq (1+0.146/H_N)^2 \quad (5b)$$

$$1 \leq D_N\text{max}/D_N\text{min} \leq (1+0.0792/H_N) \quad (15b)$$

The difference in diffusibility between the molecules of the materials have an effect on absorbance in the electrochromic layer; however, satisfying the above-mentioned relationships enables such difference to be reduced, so that the color balance of the electrochromic device can be improved.

The above-mentioned cases include the cases where $D_2$min and $D_2$max are equal to each other, where $D_3$min and $D_3$max are equal to each other, and where $D_N$min and $D_N$max are equal to each other.

The diffusion coefficient of electrochromic molecules can be measured by known electrochemical techniques. An example of such techniques is a potential step method. Measurement of a diffusion coefficient by chronoamperometry will now be described as an example of the measurement by the potential step method.

In a solution containing a supporting electrolyte (for instance, a 0.2 M solution of tetrabutylammonium hexafluorophosphate in propylene carbonate), approximately 1 mM of an electrochromic material is dissolved, the solution is subjected to bubbling with inert gas to remove dissolved oxygen. The solution is introduced into a triple-electrode cell having a working electrode (e.g., glassy carbon electrode), a counter electrode (e.g., platinum electrode), and a reference electrode (e.g., Ag/Ag$^+$ electrode). An electric potential that is enough to change the color of a material and that has been preliminarily determined by, for instance, cyclic voltammetry is applied to the working electrode; and the flowing electric current is measured for several tens of seconds. Since the time response of the electric current that has flowed obeys Formula (5), the measured transient current is plotted against the inverse square root of the elapsed time, and the diffusion coefficient can be calculated from the inclination thereof.

The suitable range of Dmax/Dmin will now be specifically described on the basis of the assumption that the electrochromic device of the embodiment is used as a unit for adjusting the amount of light (e.g., ND filter) in an imaging apparatus in a visible light region.

Six absorption spectra of normal distribution which have peak wavelengths of 300, 400, 500, 600, 700, and 800 nm with a full width at half maximum of 160 nm are used to calculate maximum absorbance ($\text{Abs}_{max}$) which enables generation of six-step transmittance (T=0.0156) between 425 nm and 700 nm; the result of the calculation is 1.08.

From Equation (12), Dmax/Dmin that enables a variation in a transmittance ratio to be within ±20% in this condition satisfies the following relationship.

$$D\text{max}/D\text{min} \leq 1.29 \quad (17)$$

Dmax/Dmin that enables a variation in a transmittance ratio to be within ±10% satisfies the following relationship.

$$D\text{max}/D\text{min} \leq 1.15 \quad (18)$$

In particular, in the case where the relationship in a diffusion coefficient between the molecules Y having a smaller diffusion coefficient [Dmin($D_Y$)] and the molecules X having a larger diffusion coefficient [Dmax($D_X$)] is within the above ranges, electrochromic devices having variations in a transmittance ratio within ±20% and ±10% can be produced, respectively.

In this case, as in the case described above, Dmax and Dmin may be any of the following diffusion coefficients (i) to (iii).

(i) $D_2$min and $D_2$max: two electrochromic materials are selected from the different electrochromic materials having the same polarity in descending order of maximum absorbance in the color-display mode of the electrochromic layer, and the diffusion coefficients of the molecules of the two materials are compared with each other in the color-display mode. The smaller diffusion coefficient is defined as $D_2$min, and the larger diffusion coefficient is defined as $D_2$max.

(ii) $D_3$min and $D_3$max: three electrochromic materials are selected from the different electrochromic materials having the same polarity in descending order of maximum absorbance in the color-display mode of the electrochromic layer, and the diffusion coefficients of the molecules of the three materials are compared with each other in the color-display mode. The smallest one is defined as $D_3$min, and the largest one is defined as $D_3$max.

(iii) $D_N$min and $D_N$max: a material of which the molecules have the largest maximum absorbance is selected, any one of materials of which the molecules have a maximum absorbance that is at least one-tenth of the maximum absorbance of the molecules having the largest maximum absorbance is also selected, and the diffusion coefficients of the molecules of the selected materials are compared with each other. The smaller one is defined as $D_N$min, and the larger one is defined as $D_N$max.

In the diffusion coefficients (i), in the case where a variation in a transmittance ratio is within ±20%, the following relationship is satisfied.

$$1 \leq D_2\text{max}/D_2\text{min} \leq 1.29 \quad (17)$$

Furthermore, in the case where a variation in a transmittance ratio is within ±10%, the following relationship is satisfied.

$$1 \leq D_2\text{max}/D_2\text{min} \leq 1.15 \quad (18)$$

In the diffusion coefficients (ii), in the case where a variation in a transmittance ratio is within ±20%, the following relationship is satisfied.

$$1 \leq D_3\text{max}/D_3\text{min} \leq 1.29 \quad (17a)$$

Moreover, in the case where a variation in a transmittance ratio is within ±10%, the following relationship is satisfied.

$$1 \leq D_3\text{max}/D_3\text{min} \leq 1.15 \quad (18a)$$

In the diffusion coefficients (iii), in the case where a variation in a transmittance ratio is within ±20%, the following relationship is satisfied.

$$1 \leq D_N\text{max}/D_N\text{min} \leq 1.29 \quad (17b)$$

Furthermore, in the case where a variation in a transmittance ratio is within ±10%, the following relationship is satisfied.

$$1 \leq D_N\text{max}/D_N\text{min} \leq 1.15 \quad (18b)$$

Applications

Figure 7:
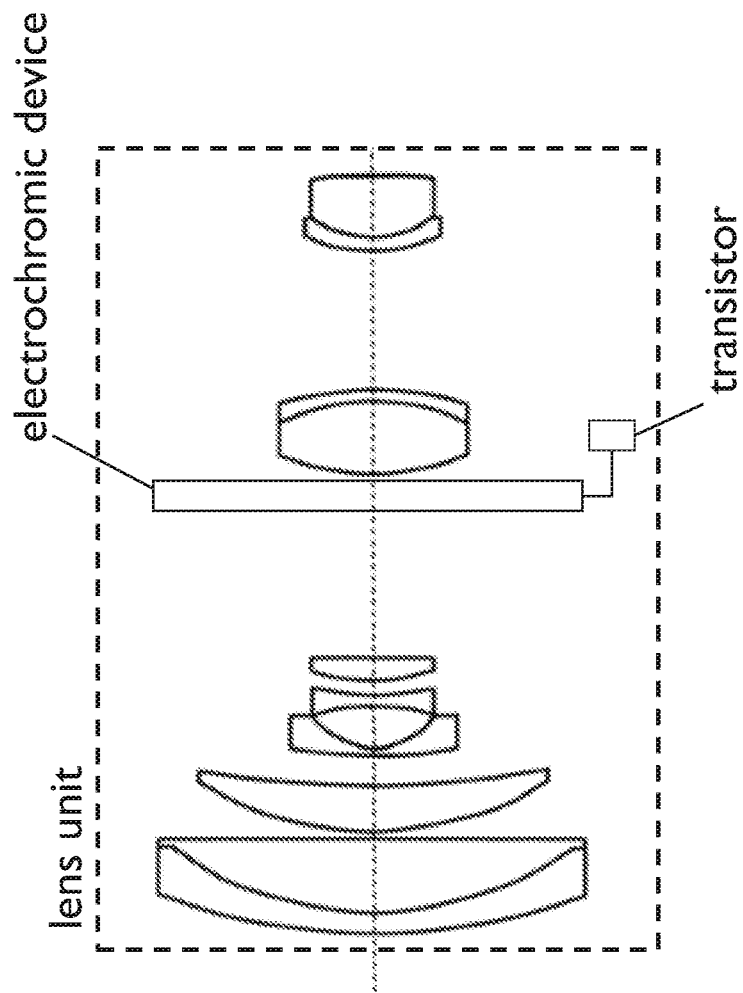
FIGS. 7 and 8 each provide an exemplary use of the subject electrochromic device employed within an apparatus, including a optical filter, lens unit and imaging apparatus.
Figure 8:
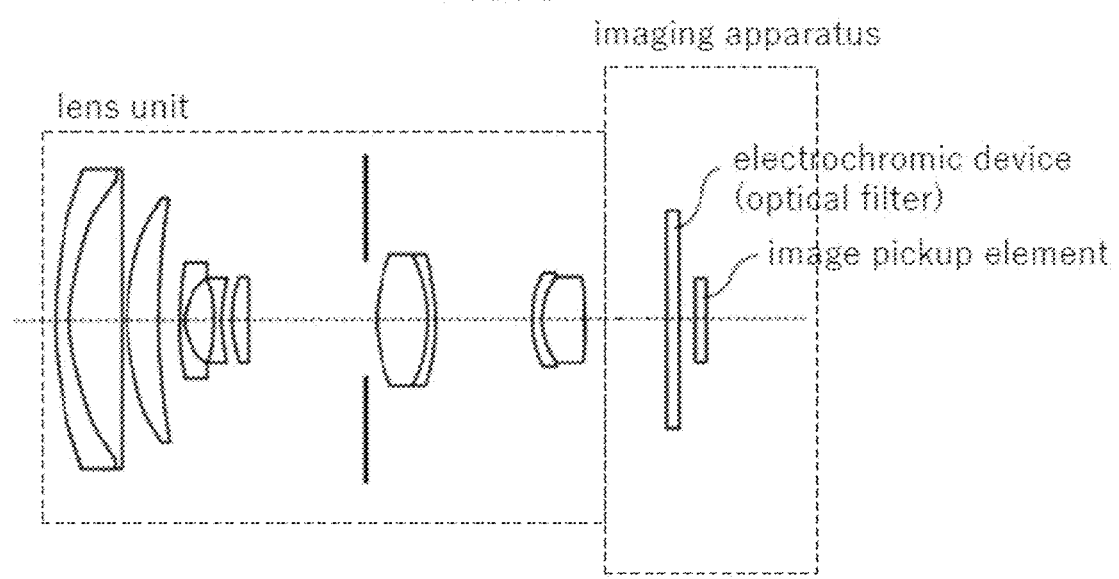

As seen in FIGS. 7 and 8, The electrochromic device of the embodiment can be used in optical filters, lens units, and imaging apparatuses. In particular, the electrochromic device, controlled by a transistor, is disposed in an optical path leading to an imaging device in an optical imaging system, so that the amount of light which the imaging device receives or the wavelength distribution characteristics of incident light can be controlled. This optical imaging system can be also referred to as a lens system. An example of the optical imaging system is a lens unit having multiple lenses.

The electrochromic device of the embodiment can be connected to a transistor or another device to serve as an electrically-controlled optical filter. Examples of the transistor include thin film transistor (TFT) devices and metal-insulator-metal (MIM) devices.

The imaging apparatus herein described includes an optical imaging system having an imaging device and an optical filter. In the case where the electrochromic device of the embodiment is used in the imaging apparatus, the electrochromic device can be disposed at any position. The electrochromic device can be disposed, for example, in front of the optical imaging system or right in front of the imaging device.

Since the electrochromic device has a high transparency in the uncolored state, the enough amount of incident light can be transmitted. In addition, in the colored state, optical properties in which incident light can be steadily shielded and modulated can be provided.

EXAMPLES

The present invention will now be further specifically described with reference to Examples; however, the present invention is not limited thereto.

Synthesis of electrochromic materials in Examples is described.

In Examples, the term "electrochromic molecules" is also referred to as "EC molecules", the term "electrochromic device" is also referred to as "EC device", and the term "electrochromic layer" is also referred to as "EC layer".

Synthesis Example 1

Synthesis of Example Compound 1 (EC Molecules 1)

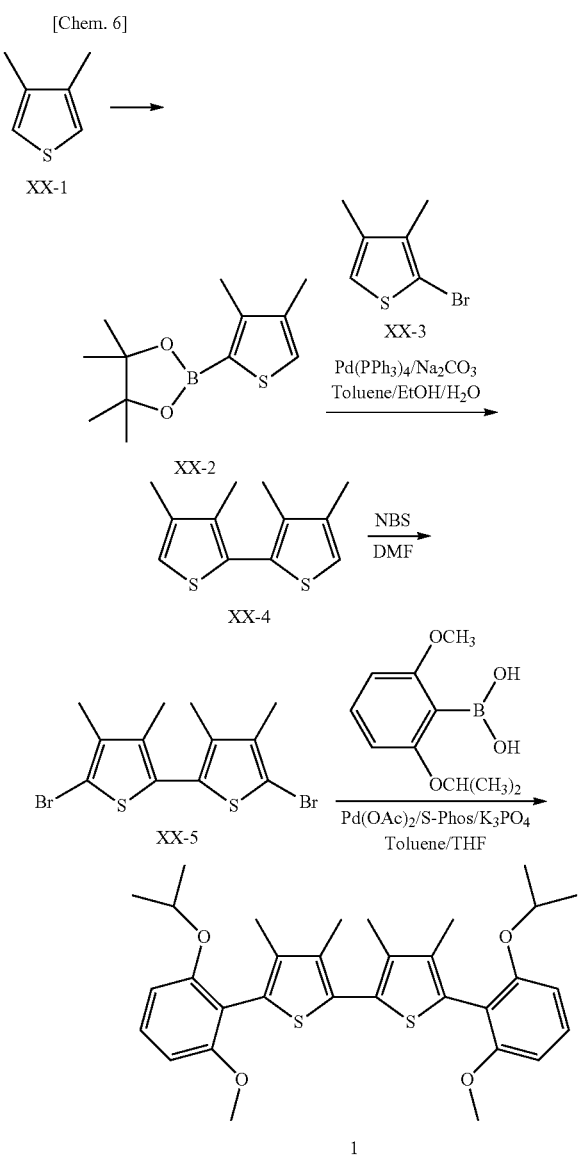

In a 100-ml reaction vessel, 2.55 g (22.7 mmol) of XX-1 (3,4-dimethylthiophene) was dissolved in 30 ml of diethyl ether, and the solution was cooled to −78° C. Into this solution, 18.2 ml of n-butyllithium (1.62 M hexane solution) was dropped, and the resulting solution was stirred at −78° C. for an hour.

Then, 5.92 g (31.8 mmol) of 2-isopropoxy-4,4,5,5-tetramethyl-1,3,2-dioxaborolane was added thereto; 30 minutes later, the temperature of the reaction solution was increased to room temperature, and the solution was stirred at room temperature for 2 hours. An aqueous ammonium chloride solution was added thereto to terminate the reaction, the product was subsequently subjected to extraction with diisopropyl ether and washing with water, and then the ether layer was concentrated under vacuum to obtain a crude product. The crude product was separated and refined by silica gel chromatography (mobile phase: heptane/toluene=1/1) to produce a colorless liquid XX-2.

In a 200-ml reaction vessel, 4.62 g (ca. 10 mmol) of the XX-2 and 2.96 g (15.5 mmol) of XX-3 were mixed with each other in a mixture solvent of toluene/ethanol/distilled water (25 ml/13 ml/25 ml), and dissolved oxygen was removed with nitrogen.

Then, 0.27 g (0.233 mmol) of Pd(PPh$_3$)$_4$ and 2.5 g (23.3 mmol) of sodium carbonate were added thereto under a nitrogen atmosphere, and a thermal reaction was carried out at 90° C. for 21 hours. The reaction solution was cooled to room temperature and condensed under vacuum. The product was separated and refined by silica gel chromatography (mobile phase: heptane) to produce XX-4 (1.0 g).

In a 100-mL reaction vessel, 1.30 g (5.86 mmol) of the XX-4 was dissolved in 40 ml of DMF. Then, 2.71 g (15.2 mmol) of N-bromosuccinimide was added thereto, and the resulting solution was stirred at room temperature for 6 hours. Water was added to the reaction solution, and precipitate was dispersed and washed with methanol and then separated by filtration to produce XX-5 (1.97 g).

In a 100-mL reaction vessel, 464 mg of (1.22 mmol) of the XX-5 and 771 mg (3.67 mmol) of 2-isopropoxy-6-methoxyphenylboronic acid were mixed with each other in a mixture solvent of toluene/tetrahydrofuran (6 ml/6 ml), and the dissolved oxygen was removed with nitrogen.

Then, 11.0 mg (0.049 mmol) of Pd(OAc)$_2$, 50 mg (0.122 mmol) of 2-dicyclohexylphosphino-2',6'-dimethoxybiphenyl (S-Phos), and 1.41 g (6.12 mmol) of tripotassium phosphate were added thereto under a nitrogen atmosphere, and the product was refluxed under heating at 110° C. to perform a reaction for 13 hours. The reaction solution was cooled to room temperature and condensed under vacuum. The product was separated and refined by silica gel chromatography (mobile phase: hexane/chloroform=1/3) to produce white solid powder 1 (29 mg). The compound was analyzed by matrix-assisted laser desorption-ionization mass spectrometry (MALDI-MS), and the analysis showed a value of 524 which was M$^+$ of this compound. The result of analysis of a nuclear magnetic resonance (NMR) spectrum was as follows.

$^1$H-NMR (CDCl$_3$) σ (ppm): 7.24 (t, 2H), 6.64 (d, 2H), 6.61 (d, 2H), 4.35 (sept, 2H), 3.79 (s, 6H), 2.14 (s, 6H), 1.94 (s, 6H), 1.23 (d, 6H), and 1.18 (d, 6H)

Synthesis Example 2

Synthesis of Example Compound 2 (EC Molecules 2)

[Chem. 7]

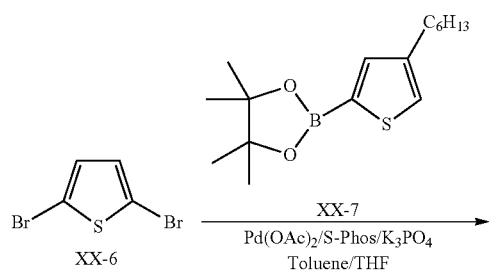

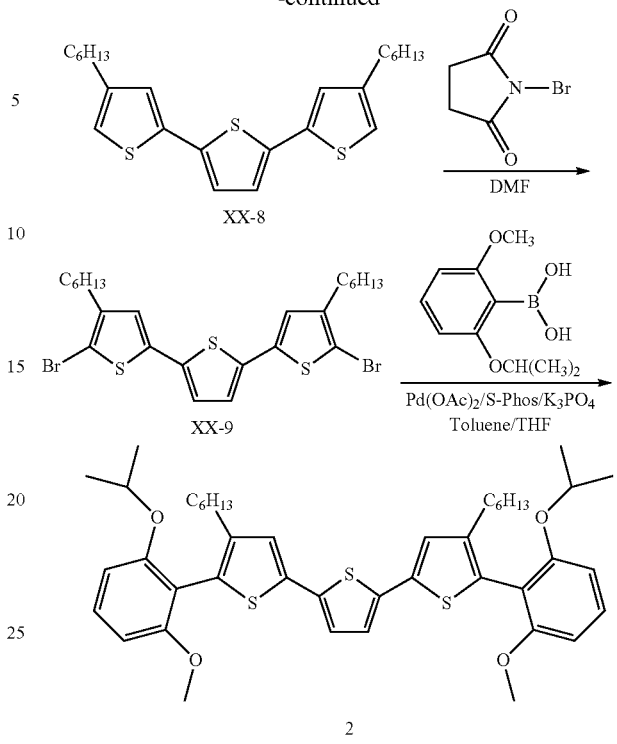

In a 50-mL reaction vessel, 300 mg (1.24 mmol) of XX-6 and 1.10 g (3.72 mmol) of XX-7 were mixed with each other in a mixture solvent of toluene/tetrahydrofuran (8 ml/4 ml), and the dissolved oxygen was removed with nitrogen. Then, 8.4 mg (0.037 mmol) of Pd(OAc)$_2$, 40.7 mg (0.0992 mmol) of 2-dicyclohexylphosphino-2',6'-dimethoxybiphenyl (S-Phos), and 1.43 g (6.2 mmol) of tripotassium phosphate were added thereto under a nitrogen atmosphere, and the product was refluxed under heating at 110° C. to perform a reaction for 7 hours. The reaction solution was cooled to room temperature and condensed under vacuum. The product was separated and refined by silica gel chromatography (mobile phase: hexane) to produce a colorless viscous liquid XX-8 (360 mg, yield: 70%).

In a 100-mL reaction vessel, 355 mg (0.852 mmol) of the XX-8 was dissolved in 25 ml of N,N-dimethylformamid (DMF). Then, 333 mg (1.87 mmol) of N-bromosuccinimide was added thereto, and the resulting solution was stirred at room temperature for 8 hours. Water was added to the reaction solution, and the product was subjected to extraction with chloroform and washing with water. The resulting product was subsequently concentrated under vacuum to produce XX-9 (470 mg, yield: 96%).

In a 50-mL reaction vessel, 470 mg (0.818 mmol) of the XX-9 and 515 mg (2.45 mmol) of 2-isopropoxy-6-methoxyphenylboronic acid were mixed with each other in a mixture solvent of toluene/tetrahydrofuran (5 ml/2.5 ml), and the dissolved oxygen was removed with nitrogen. Then, 5.5 mg (0.0245 mmol) of Pd(OAc)$_2$, 27 mg (0.065 mmol) of 2-dicyclohexylphosphino-2',6'-dimethoxybiphenyl (S-Phos), and 942 mg (4.09 mmol) of tripotassium phosphate were added thereto under a nitrogen atmosphere, and the product was refluxed under heating to perform a reaction for 7 hours. The reaction solution was cooled to room temperature and then condensed under vacuum. The product was separated and refined by silica gel chromatography (mobile phase: hexane/chloroform=1/2) to produce a pale yellow solid 2 (520 mg, yield: 85%).

The structure of this compound was analyzed by NMR and MALDI-MS as in Synthesis Example 1. The analysis by MALDI-MS showed a valued of 744 which was M⁺ of the compound. The result of analysis of an NMR spectrum was as follows.

¹H-NMR (CDCl₃) σ (ppm): 7.27 (t, 2H), 7.06 (s, 2H), 7.01 (s, 2H), 6.62 (d, 2H), 6.59 (d, 2H), 4.43 (m, 2H), 3.77 (s, 6H), 2.31 (t, 4H), 1.53 (m, 4H), 1.32-1.10 (m, 24H), and 0.84 (t, 6H)

¹³C-NMR (CDCl₃) σ (ppm): 159.15, 157.53, 141.83, 136.37, 135.99, 129.51, 128.33, 124.36, 123.29, 112.85, 107.51, 103.63, 71.09, 55.86, 31.74, 29.97, 29.21, 29.11, 22.61, 22.13, 22.08, and 14.13.

Synthesis Example 3

Synthesis of Example Compound 3 (EC Molecules 3)

[Chem. 8]

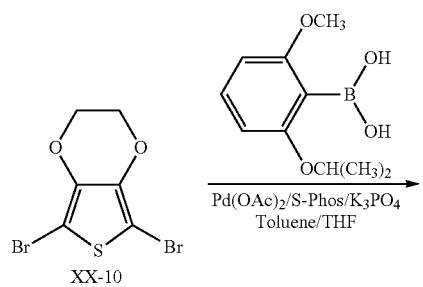

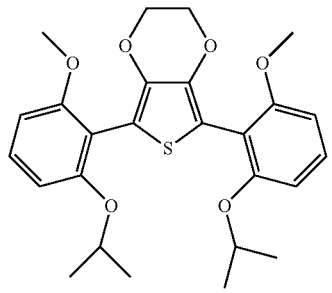

3

In a 50-mL reaction vessel, 500 mg (1.67 mmol) of XX-10 (2,5-dibromoethylenedioxythiophene) and 1.05 g (5.0 mmol) of 2-isopropoxy-6-methoxyphenylboronic acid were mixed with each other in a mixture solvent of toluene/tetrahydrofuran (10 ml/5 ml), and the dissolved oxygen was removed with nitrogen.

Then, 19 mg (0.083 mmol) of Pd(OAc)₂, 89 mg (0.22 mmol) of 2-dicyclohexylphosphino-2',6'-dimethoxybiphenyl (S-Phos), and 1.92 g (8.35 mmol) of tripotassium phosphate were added thereto under a nitrogen atmosphere, and the product was refluxed under heating at 110° C. to perform a reaction for 7 hours. The reaction solution was cooled to room temperature and condensed under vacuum. The product was separated and refined by silica gel chromatography (mobile phase: hexane/ethyl acetate=4/3) to produce white solid powder 3 (420 mg, yield: 54%).

The product was analyzed by MALDI-MS as in Synthesis Example 1, and the analysis showed a value of 470 which was M⁺ of this compound. The result of analysis of an NMR spectrum was as follows.

¹H-NMR (CDCl₃) σ (ppm): 7.21 (t, 2H), 6.63 (d, 2H), 6.60 (d, 2H), 4.41 (m, 2H), 4.20 (s, 4H), 3.81 (s, 6H), 1.25 (s, 6H), and 1.24 (s, 6H).

Synthesis Example 4

Synthesis of Example Compound 4 (EC Molecules 4)

[Chem. 9]

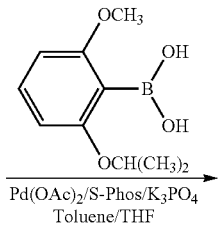

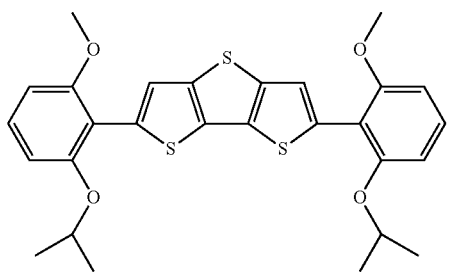

4

In a 50-mL reaction vessel, 177.05 mg (0.50 mmol) of XX-11 and 420 mg (2.0 mmol) of 2-isopropoxy-6-methoxyphenylboronic acid were mixed with each other in a mixture solvent of toluene/tetrahydrofuran (6 ml/3 ml), and the dissolved oxygen was removed with nitrogen.

Then, 2.3 mg (0.01 mmol) of Pd(OAc)₂, 10.3 mg (0.0 25 mmol) of 2-dicyclohexylphosphino-2',6'-dimethoxybiphenyl (S-Phos), and 575.7 mg (2.5 mmol) of tripotassium phosphate were added thereto under a nitrogen atmosphere, and the product was refluxed under heating at 110° C. to perform a reaction for 8 hours. The reaction solution was cooled to room temperature and condensed under vacuum. The product was separated and refined by silica gel chromatography (mobile phase: hexane/chloroform=1/2) to produce white solid powder 4 (187 mg, yield: 71%). The product was analyzed by MALDI-MS, and the analysis showed a value of 524 which was M⁺ of this compound.

Synthesis Example 5

Synthesis of Example Compound 5 (EC Molecules 5)

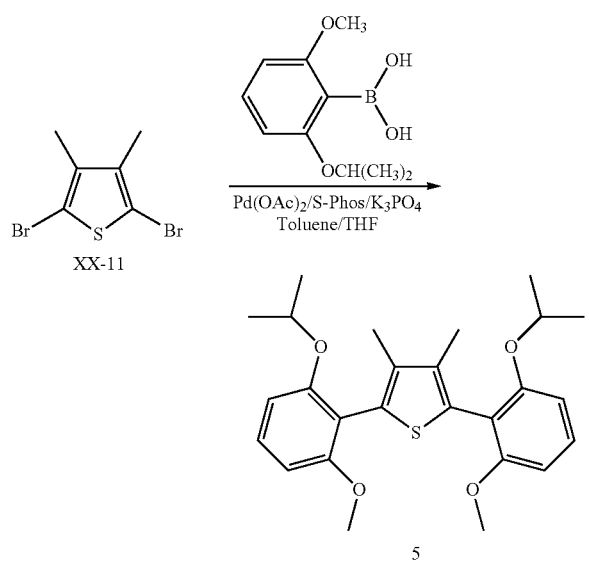

In a 300-mL reaction vessel, 5.0 g (44.6 mmol) of XX-1 (3,4-dimethylthiophene) was dissolved in 80 ml of N,N-dimethylformamid (DMF). Then, 31.7 g (178 mmol) of N-bromosuccinimide was added thereto, and the resulting solution was stirred at room temperature for an hour. Water was added to the reaction solution, and the product was subjected to extraction with diethyl ether/hexane (1/1) and washing with water. The resulting product was subsequently concentrated under vacuum to produce XX-11.

In a 50-ml reaction vessel, 500 mg (1.85 mmol) of the XX-11 and 1.17 g (5.56 mmol) of 2-isopropoxy-6-methoxyphenylboronic acid were mixed with each other in a mixture solvent of toluene/tetrahydrofuran (5 ml/5 ml), and the dissolved oxygen was removed with nitrogen.

Then, 16.6 mg (0.074 mmol) of Pd(OAc)$_2$, 76 mg (0.185 mmol) of 2-dicyclohexylphosphino-2',6'-dimethoxybiphenyl (S-Phos), and 2.13 g (9.26 mmol) of tripotassium phosphate were added thereto under a nitrogen atmosphere, and the product was refluxed under heating at 100° C. to perform a reaction for 6 hours.

The reaction solution was cooled to room temperature and condensed under vacuum. The product was separated and refined by silica gel chromatography (mobile phase: hexane/ethyl acetate=5/2) to produce a colorless viscous liquid 5.

The structure of the compound 5 was analyzed by mass spectrometry (MS) and nuclear magnetic resonance (NMR) spectrometry as in Synthesis Example 1. In results of the analyses, the structure was well identified from the molecular weight and the ratio of integrated values of NMR peaks.

Production of a device will now be described.

Production Example

Thin films of fluorine-doped tin oxide (FTO) with a thickness of 200 nm were formed on glass substrates having a thickness of 1.1 mm to prepare two transparent electrodes. The FTO transparent electrodes each had an average visible light transmittance of 85% and a sheet resistance of 40 Ω/□.

Slurry of tin oxide nanoparticles having an average particle size of 21 nm and slurry of zinc oxide nanoparticles having an average particle size of 34 nm were mixed with each other such that a volume ratio of tin oxide to zinc oxide was 2:1, and the mixture was applied onto one of the two FTO transparent electrodes. The product was burned at 500° C. for 30minutes, and then only the zinc oxide was removed by etching with dilute hydrochloric acid to form a porous film of the tin oxide nanoparticles. The thickness of the porous film was approximately 5.0 μm.

The other one of the FTO transparent electrodes and the porous film of the tin oxide nanoparticles were attached to each other with the aid of an epoxy resin such that the conductive surfaces thereof faced each other and such that an inlet from which a solution was to be injected was formed. A film or beads having a different thickness was used as a spacer to adjust the distance between the electrodes. In the following description, the FTO transparent electrode of the device serves as a working electrode.

EC molecules and a supporting electrolyte which was 0.2 M of tetrabutylammonium hexafluorophosphate were dissolved in propylene carbonate to prepare an EC composition.

Into the device which had been produced as described above so as to have the inlet, the EC composition was put from the inlet by vacuum injection to form an EC layer. Then, the inlet was sealed with an epoxy resin to complete an electrochromic device.

Measurement in Examples will now be described.

Measurement Example 1

The diffusion coefficient of EC molecules was measured as described below.

The diffusion coefficient of EC molecules was measured by chronoamperometry. In a 0.2 M solution of tetrabutylammonium hexafluorophosphate in propylene carbonate (PC), 1 mM of EC molecules were dissolved, and bubbling was carried out with nitrogen to removed dissolved oxygen. A plane glassy carbon electrode having a diameter of 3 mm was used as a working electrode, platinum was used as a counter electrode, Ag/Ag$^+$ (PF$_6$,PC) was used as a reference electrode, and the solution of the EC molecules was introduced thereto to prepare a measurement cell. The measurement was carried out in a glove box filled with nitrogen at 25° C. An electric potential that gave the oxidation (reduction in a cathodic EC material) peak of an EC material was recorded by cyclic voltammetry. In the measurement by chronoamperometry, an electric potential (electric potential that sufficiently exceeded the first redox potential but did not exceed the second redox potential) that was on a positive (negative in a cathodic EC material) side by approximately 0.2 to 0.25 V relative to the recorded peak potential was applied from an electric potential that was on a negative (positive in a cathodic EC material) side from the electric potential at which oxidation (reduction in a cathodic EC material) current started to flow. The electric current was recorded for 60 seconds, and the measured transient current was plotted against the inverse square root of the elapsed time, and the diffusion coefficient was calculated from the inclination thereof.

Table 1 shows the measured diffusion coefficients of the EC molecules 1 to 5 described in Synthetic Examples and 4-bromo-4',4"-dimethyltriphenylamine (EC molecules 6), 1-n-heptyl-1'-phenyl-4,4'-bipyridinium dihexafluorophosphate (EC molecules 7), and heptylviologen dihexafluorophosphate (EC molecules 8).

TABLE 1

| EC Molecules | Diffusion Coefficient/×$10^{-6}$ cm$^2$s$^{-1}$ |
|---|---|
| 1 | 2.0 |
| 2 | 1.8 |
| 3 | 2.7 |
| 4 | 2.2 |
| 5 | 3.7 |
| 6 | 3.7 |
| 7 | 2.6 |
| 8 | 2.5 |

Measurement Example 2

EC devices were analyzed as follows.

An electrode of an EC device produced as described in Production Example was connected to a potentiostat, light beams having different wavelengths ranging from an ultraviolet region to a near infrared region were emitted to the coloring part thereof, and the intensity of transmitted light was measured with a spectrometer. An electric potential of 0.32 V (in Example 10, −1.25 V) vs. Ag/Ag$^+$ (PF$_6$,PC) was applied to the working electrode with the potentiostat, and the absorption spectrum was recorded. In an EC device in which different EC materials were used, coloring of each of the EC materials was identified by dividing the recorded absorption spectrum by the preliminarily obtained absorption spectrum of the EC material.

Measurement Example 3

Results of simulations for analyzing EC devices will now be described.

Tables 2 and 3 show the conditions of the EC devices in the simulations.

TABLE 2

|  | Example 1 | Example 2 | Example 3 | Example 4 | Comparative Example 1 |
|---|---|---|---|---|---|
| Distance between Electrodes/μm | 100 | 120 | 130 | 20 | 100 |
| Employed EC Molecules 1 | 1 | 4 | 4 | 3 | 3 |
| Diffusion Coefficient/×$10^{-6}$ cm$^2$s$^{-1}$ | 2.0 | 2.2 | 2.2 | 2.7 | 2.7 |
| ε/×$10^4$ M$^{-1}$ cm$^{-1}$ | 2.2 | 3.4 | 3.4 | 1.5 | 1.5 |
| Concentration/mM | 10 | 5.3 | 4.9 | 71 | 14 |
| Employed EC Molecules 2 | 2 | 1 | 1 | 4 | 2 |
| Diffusion Coefficient/×$10^{-6}$ cm$^2$s$^{-1}$ | 1.8 | 2.0 | 2.0 | 2.2 | 1.8 |
| ε/×$10^4$ M$^{-1}$ cm$^{-1}$ | 3.2 | 2.2 | 2.2 | 3.4 | 3.2 |
| Concentration/mM | 7.1 | 8.7 | 8.0 | 35 | 8.3 |
| Employed EC Molecules 3 | — | — | 2 | — | — |
| Diffusion Coefficient/×$10^{-6}$ cm$^2$s$^{-1}$ |  |  | 1.8 |  |  |
| ε/×$10^4$ M$^{-1}$ cm$^{-1}$ |  |  | 3.2 |  |  |
| Concentration/mM |  |  | 5.8 |  |  |

TABLE 3

|  | Example 5 | Example 6 | Example 7 | Example 8 | Example 9 | Example 10 | Example 11 | Comparative Example 2 |
|---|---|---|---|---|---|---|---|---|
| Distance between Electrodes/μm | 50 | 50 | 50 | 50 | 50 | 50 | 50 | 50 |
| Employed EC Molecules 1 | 4 | 3 | 4 | 1 | 4 | 5 | 7 | 3 |
| Diffusion Coefficient/×$10^{-6}$ cm$^2$s$^{-1}$ | 2.2 | 2.7 | 2.2 | 2.0 | 2.2 | 3.7 | 2.6 | 2.7 |
| ε/×$10^4$ M$^{-1}$ cm$^{-1}$ | 3.4 | 1.5 | 3.4 | 2.2 | 3.4 | 1.6 | 5.5 | 1.5 |
| Concentration/mM | 8.3 | 18 | 15 | 26 | 19 | 18 | 5.1 | 18 |
| Employed EC Molecules 2 | 1 | 4 | 1 | 2 | 1 | 6 | 8 | 2 |
| Diffusion Coefficient/×$10^{-6}$ cm$^2$s$^{-1}$ | 2.0 | 2.2 | 2.0 | 1.8 | 2.0 | 3.7 | 2.5 | 1.8 |
| ε/×$10^4$ M$^{-1}$ cm$^{-1}$ | 2.2 | 3.4 | 2.2 | 3.2 | 2.2 | 1.5 | 2.6 | 3.2 |
| Concentration/mM | 13 | 9.2 | 25 | 19 | 31 | 19 | 11 | 10.8 |
| Employed EC Molecules 3 | 2 | 1 | 2 | — | — | — | — | — |
| Diffusion Coefficient/×$10^{-6}$ cm$^2$s$^{-1}$ | 1.8 | 2.0 | 1.8 |  |  |  |  |  |
| ε/×$10^4$ M$^{-1}$ cm$^{-1}$ | 3.2 | 2.2 | 3.2 |  |  |  |  |  |
| Concentration/mM | 9.7 | 15 | 18 |  |  |  |  |  |

The analysis of the EC devices according to the present invention will now be described with reference to typical examples.

Figure 4A:
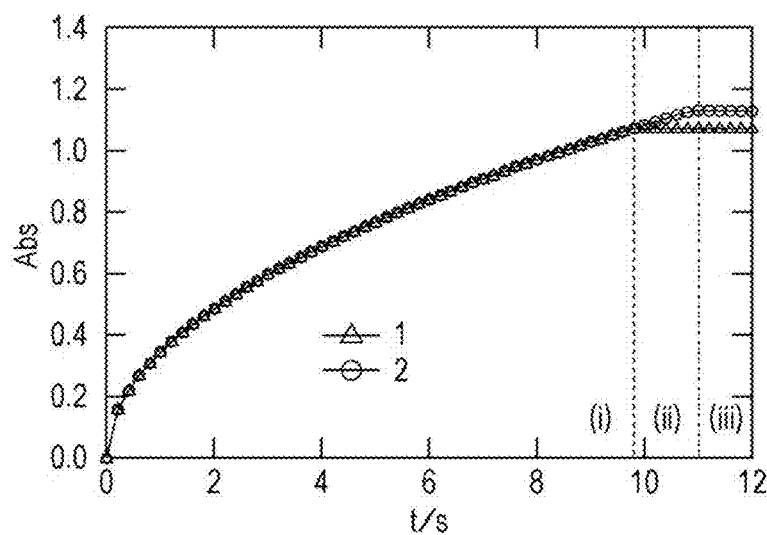
FIGS. 4A and 4B illustrate temporal changes in maximum absorbance in absorption spectra derived from different electrochromic molecules.

FIG. 4A illustrates temporal changes in the maximum absorbance (vertical axis) in absorption spectra derived from the EC molecules used in the EC device of Example 1. The relationship between the absorbance (peak wavelength: 436 nm) attributed to the EC molecules 1 and represented by triangles and the absorbance (peak wavelength: 638 nm) attributed to the EC molecules 2 and represented by circles in FIG. 4A will now be described.

As described in the section "Diffusion Coefficient" in DESCRIPTION OF EMBODIMENT, the maximum absorbance derived from each of the EC molecules 1 and 2 increased in the time domain (i) defined by a vertical dashed line in FIG. 4A; thus, the color balance did not change in the time domain (i). In the time domain (ii), however, the colored material of the EC molecules 1 having a relatively large diffusion coefficient reached the counter electrode first, and an increase in the absorbance thereof therefore stopped. The absorbance of the EC molecules 2 having a relatively small diffusion coefficient increased also in the time domain (ii); thus, the relationship in absorbance therebetween (color balance) changed. Then, in the time domain (iii), the difference in absorbance therebetween was the maximum. In the EC device of Example 1, however, since the diffusion coefficients of the EC molecules 1 and 2 had been adjusted to be close to each other (Dmax/Dmin=1.1), the difference in absorbance therebetween was small.

Figure 4B:
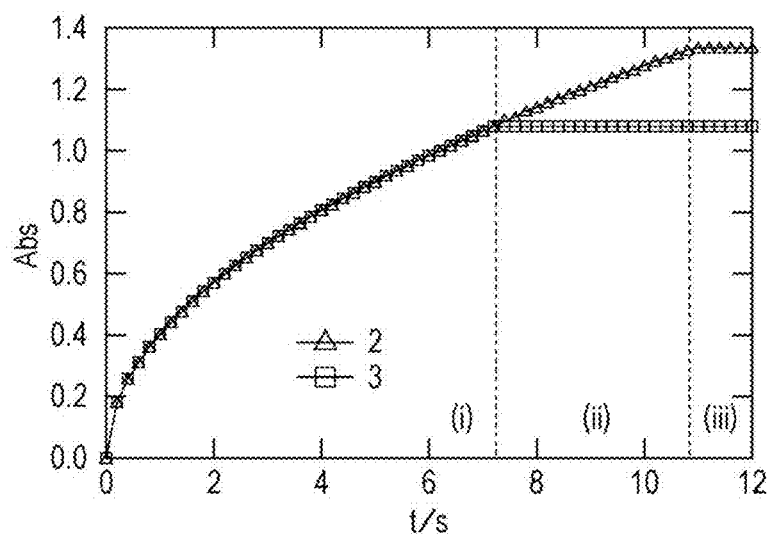

FIG. 4B illustrates, as in FIG. 4A, temporal changes in the maximum absorbance in absorption spectra derived from the EC molecules used in the EC device of Comparative Example 1. The relationship between the absorbance (peak wavelength: 638 nm) attributed to the EC molecules 2 and represented by triangles and the absorbance (peak wavelength: 456 nm) attributed to the EC molecules 3 and represented by squares in FIG. 4B will now be described.

As in FIG. 4A, the maximum absorbance derived from each of the EC molecules 2 and 3 increased in the time domain (i); thus, the color balance did not change in the time domain (i). In the time domain (ii), however, the colored material of the EC molecules 3 having a relatively large diffusion coefficient reached the counter electrode first, and an increase in the absorbance thereof therefore stopped. The absorbance of the EC molecules 2 having a relatively small diffusion coefficient increased also in the time domain (ii); thus, the relationship in absorbance therebetween (color balance) changed. Then, in the time domain (iii), the difference in absorbance therebetween was the maximum. In the EC device of Comparative Example 1, since the difference in a diffusion coefficient between the EC molecules 2 and 3 were larger than the difference in a diffusion coefficient in Example 1 (Dmax/Dmin=1.5), the difference in absorbance therebetween was large.

Figure 5:
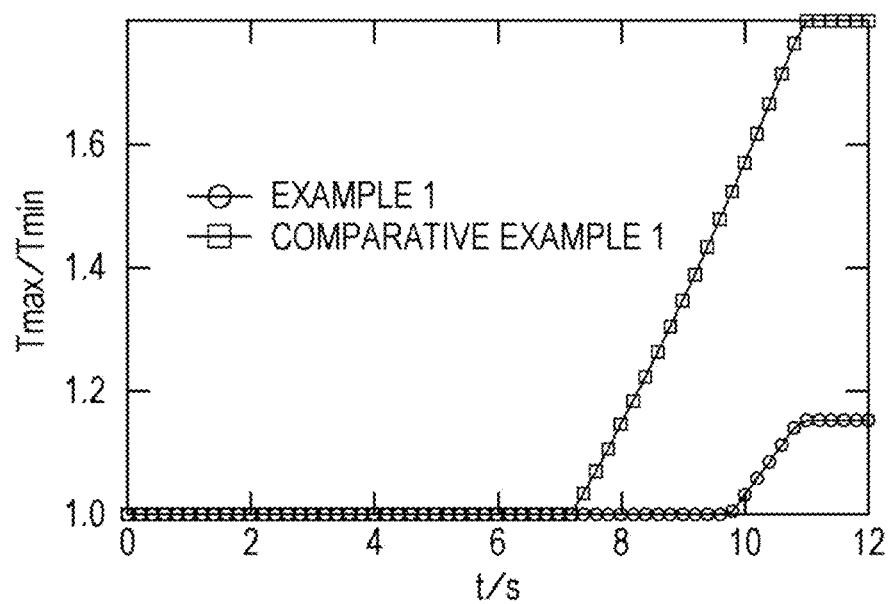
FIG. 5 illustrates transmittance ratios in transmission spectra derived from different electrochromic molecules.

FIG. 5 illustrates ratios of maximum transmittance to minimum transmittance in transmission spectra derived from the EC molecules in the EC devices of Example 1 and Comparative Example 1 (wavelengths were the same as those in the analysis of the above-mentioned maximum absorbance). From FIG. 5, a variation in a transmittance ratio in Example 1, which is represented by circles in FIG. 5, was within 20% (±10%), and Example 1 was therefore able to be applied to an EC device in which wavelength was highly controlled; in contrast, a variation in a transmittance ratio in Comparative Example 1 was over 40% (±20%), which shows that Comparative Example 1 was in a state in which wavelength was relatively uncontrolled.

Figure 6A:
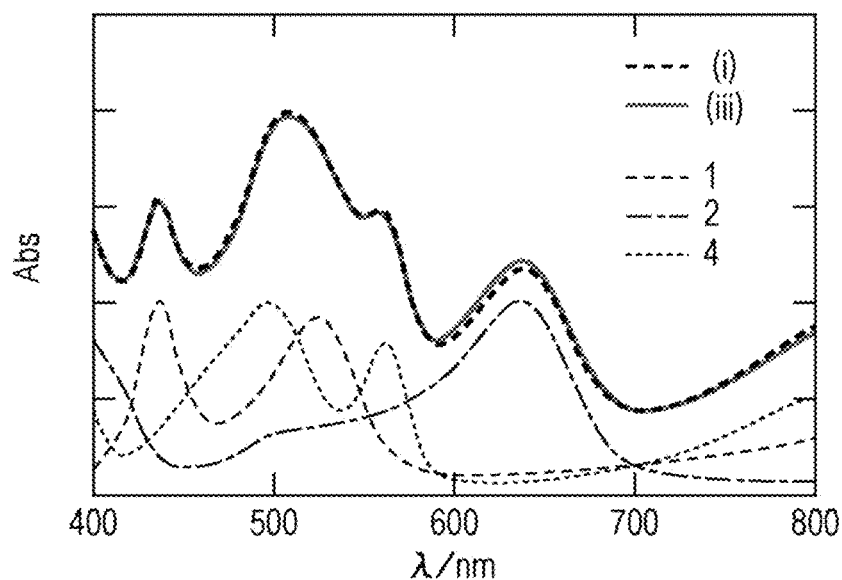
FIGS. 6A and 6B illustrate absorption spectra in a time domain (i) and a time domain (iii).
Figure 6B:
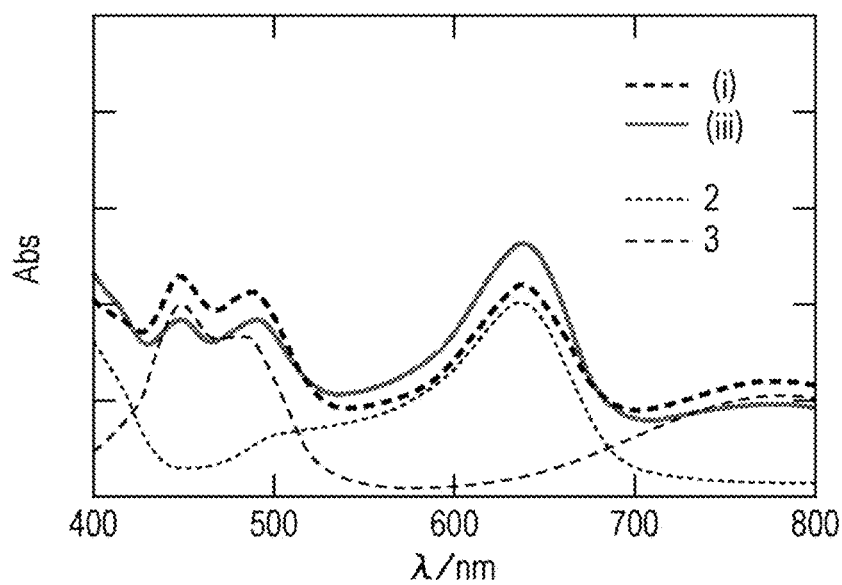

FIG. 6A illustrates absorption spectra in the EC device of Example 3 in the time domain (i) and the time domain (iii); in the absorption spectra, the absorbance is normalize for the convenience of comparison. In FIG. 6A, the vertical axis represents normalized absorbance, and the horizontal axis represents wavelength. In FIG. 6A, a bold dashed line represents the absorption spectrum in the time domain (i), and a bold solid line represents the absorption spectrum in the time domain (iii). FIG. 6A also illustrates spectra [in the time domain (i)] obtained in analysis of the EC molecules used in the device. A line consisting of long dashes represents an analyzed spectrum derived from the EC molecules 1, a line consisting of dashes and dots represents an analyzed spectrum derived from the EC molecules 2, and a line consisting of short dashes represents an analyzed spectrum derived from the EC molecules 3. FIG. 6B illustrates normalized absorption spectra in the EC device of Comparison Example 1 in the time domain (i) and the time domain (iii) as in FIG. 6A. FIG. 6B also illustrates spectra [in the time domain (i)] obtained in analysis of the EC molecules used in the device. A line consisting of short dashes represents an analyzed spectrum derived from the EC molecules 2, and a line consisting of long dashes represents an analyzed spectrum derived from the EC molecules 3.

Figure 6C:
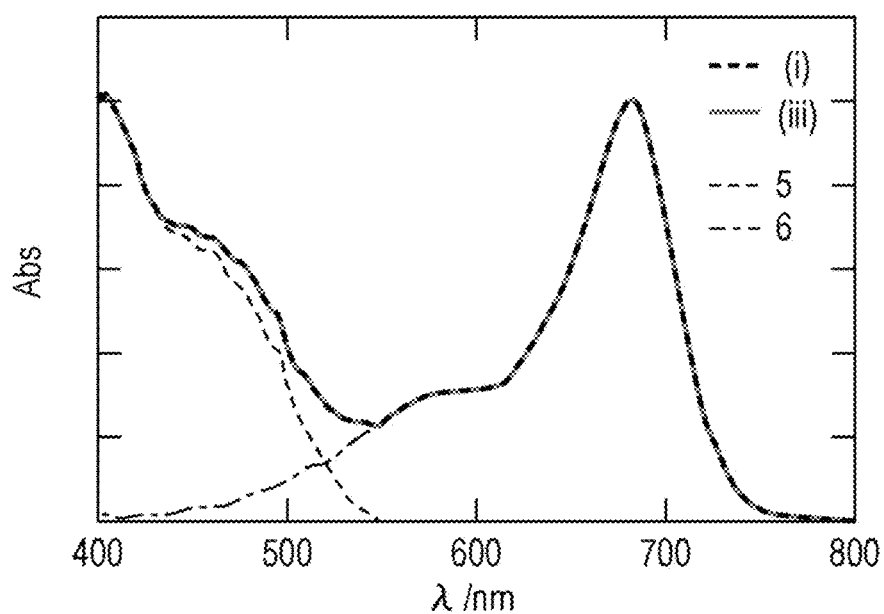

FIG. 6C illustrates normalized absorption spectra in the EC device of Example 10 in the time domain (i) and the time domain (iii) as in FIG. 6A. FIG. 6C also illustrates spectra [in the time domain (i)] obtained in analysis of the EC molecules used in the device. A line consisting of dashes represents an analyzed spectrum derived from the EC molecules 5, and a line consisting of dashes and dots represents an analyzed spectrum derived from the EC molecules 6.

Figure 6D:
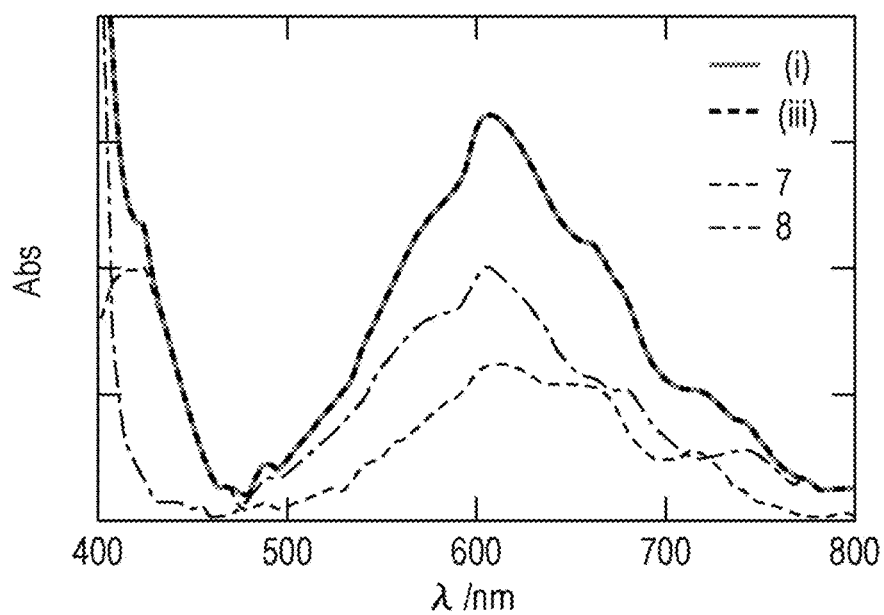

FIG. 6D illustrates normalized absorption spectra in the EC device of Example 11 in the time domain (i) and the time domain (iii) as in FIG. 6A. FIG. 6D also illustrates spectra [in the time domain (i)] obtained in analysis of the EC molecules used in the device. A line consisting of dashes represents an analyzed spectrum derived from the EC molecules 7, and a line consisting of dashes and dots represents an analyzed spectrum derived from the EC molecules 8.

From comparison of FIG. 6A with FIG. 6B, a change in the absorption spectrum from the time domain (i) to the time domain (iii) was small in the EC device of Example 3 but large in the EC device of Comparative Example 1.

As is clear from FIGS. 6C and 6D, reducing the difference in a diffusion coefficient between the different EC molecules used in the EC device enabled a great reduction in a change of the absorption spectrum in the EC device from the time domain (i) to the time domain (iii). This approach was effective in cases in which amines having aromatic rings were used as anodic materials and in which cathodic materials were used.

Table 4 shows maximum absorbance (H) provided by molecules having a diffusion coefficient Dmax, a ratio of Dmax/Dmin, and a transmittance ratio (Tmax/Tmin) provided by EC molecules individually having diffusion coefficients Dmax and Dmin in the time domain (iii) in each of the EC devices of Examples and Comparative Examples shown in Table 2 and having the above-mentioned tendency. In Table 4, the description of "(two molecules A and B)" refers to the relationship between molecules A which are molecules having the largest maximum absorbance in a device of Example and molecules B which are molecules having the same maximum absorbance as the molecules A or having the second largest maximum absorbance. In Table 4, the description of "(three molecules A, B, and C)" refers to the relationship between three molecules A, B, and C each having a large maximum absorbance. The description "(A and group G)" refers to the relationship between the molecules A which are molecules having the largest maximum absorbance and one type of molecules selected from a group G which is a group of different electrochromic molecules each having a maximum absorbance that is at least one-tenth of the maximum absorbance of the molecules A.

TABLE 4

|  | Example 1 | Example 2 | Example 3 | Example 4 | Comparative Example 1 |
|---|---|---|---|---|---|
| H | 1.08 | 1.08 | 1.08 | 1.08 | 1.08 |
| Dmax/Dmin (Two Molecules A and B) | 1.11 | 1.10 | 1.11 | 1.23 | 1.50 |

TABLE 4-continued

|  | Example 1 | Example 2 | Example 3 | Example 4 | Comparative Example 1 |
|---|---|---|---|---|---|
| Tmax/Tmin (Two Molecules A and B) | 1.14 | 1.13 | 1.13 | 1.31 | 1.75 |
| Dmax/Dmin (Three Molecules A, B, and C or Molecules A and Group G) | — | — | 1.22 | — | — |
| Tmax/Tmin (Three Molecules A, B, and C or Molecules A and Group G) | — | — | 1.30 | — | — |

Table 4 gives the following matters.

In the case where the relationship in a diffusion coefficient was Dmax/Dmin≤1.11, the relationship Tmax/Tmin≤1.14 was provided in the time domain (iii). Accordingly, an EC device in which the relationship in a diffusion coefficient was within this range was an EC device in which a variation in transmittance was greatly reduced (not more than ±10%) [Example 1, Example 2, and Example 3 (two molecules)].

In the case where the relationship in a diffusion coefficient was Dmax/Dmin≤1.23, the relationship Tmax/Tmin≤1.31 was provided in the time domain (iii). Accordingly, an EC device in which the relationship in a diffusion coefficient was within this range was an EC device in which a variation in transmittance was reduced (not more than ±20%) [Example 3 (three molecules or molecules A and group G) and Example 4].

In the case where the relationship in a diffusion coefficient was Dmax/Dmin=1.5, the relationship Tmax/Tmin=1.75 was provided in the time domain (iii). Accordingly, an EC device in which the relationship in a diffusion coefficient was within this range was an EC device in which a variation in transmittance was relatively not reduced (Comparative Example 1).

As in Table 4, Table 5 shows maximum absorbance (H) provided by molecules having a diffusion coefficient Dmax, a ratio of Dmax/Dmin, and a transmittance ratio (Tmax/Tmin) provided by EC molecules individually having diffusion coefficients Dmax and Dmin in the time domain (iii) in each of the EC devices of Examples and Comparative Examples shown in Table 3.

TABLE 5

|  | Example 5 | Example 6 | Example 7 | Example 8 | Example 9 | Example 10 | Example 11 | Comparative Example 2 |
|---|---|---|---|---|---|---|---|---|
| H | 0.7 | 0.7 | 1.3 | 1.4 | 1.6 | 0.7 | 0.7 | 0.7 |
| $(1 + 0.0792/H)^2$ | 1.24 | 1.24 | 1.13 | 1.12 | 1.10 | 1.24 | 1.24 | 1.24 |
| $(1 + 0.146/H)^2$ | 1.46 | 1.46 | 1.24 | 1.22 | 1.19 | 1.46 | 1.46 | 1.46 |
| Dmax/Dmin (Two Molecules A and B) | 1.11 | 1.10 | 1.11 | 1.11 | 1.10 | 1.00 | 1.04 | 1.50 |
| Tmax/Tmin (Two Molecules A and B) | 1.08 | 1.19 | 1.16 | 1.19 | 1.20 | 1.00 | 1.03 | 1.44 |
| Dmax/Dmin (Three Molecules A, B, and C or Molecules A and Group G) | 1.22 | 1.35 | 1.22 |  |  |  |  |  |
| Tmax/Tmin (Three Molecules A, B, and C or Molecules A and Group G) | 1.19 | 1.30 | 1.37 |  |  |  |  |  |

Table 5 gives the following matters.

In the case where the relationship in a diffusion coefficient was Dmax/Dmin≤$(1+0.0792/H)^2$, the relationship Tmax/Tmin≤1.20 was provided in the time domain (iii). Accordingly, an EC device in which the relationship in a diffusion coefficient was within this range was an EC device in which a variation in transmittance was greatly reduced (not more than ±10%) [Example 5, Example 6 (two molecules), Example 7 (two molecules), Example 8, Example 9, Example 10, and Example 11].

In the case where the relationship in a diffusion coefficient was Dmax/Dmin≤$(1+0.146/H)^2$, the relationship Tmax/Tmin≤1.37 was provided in the time domain (iii). Accordingly, an EC device in which the relationship in a diffusion coefficient was within this range was an EC device in which a variation in transmittance was reduced (not more than ±20%) [Example 6 (three molecules or molecules A and group G), and Example 7 (three molecules or molecules A and group G)].

In the case where the relationship in a diffusion coefficient between the molecules A having the largest maximum absorbance and the molecules B having the same maximum absorbance as the molecules A or having the second largest maximum absorbance was Dmax/Dmin=1.5, the relationship Tmax/Tmin=1.44 was provided in the time domain (iii). Accordingly, an EC device in which the relationship in a diffusion coefficient was within this range was an EC device in which a variation in transmittance was not sufficiently reduced (Comparative Example 2).

The present invention provides an organic electrochromic device which enables a change in a color balance thereof in a color-display mode to be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-258422, filed Dec. 13, 2013, and Japanese Patent Application No. 2014-219767, filed Oct. 28, 2014, which are hereby incorporated by reference herein in their entirety.

The invention claimed is:

1. An electrochromic device comprising:
a pair of electrodes; and
an electrochromic layer disposed between the pair of electrodes and containing different electrochromic materials having the same polarity,
wherein, in the case where two materials are selected from the different electrochromic materials having the same polarity in descending order of maximum absorbance under a situation in which the electrochromic layer is in a colored state, diffusion coefficients of the two materials are the same or are different from each other and,
wherein, in the case where the diffusion coefficients of the two materials are different from each other, a diffusion coefficient $D_2$min of a material that is one of the two materials and has a smaller diffusion coefficient than the other material in the two materials, a diffusion coefficient $D_2$max of the other material that is in the two materials and has a larger diffusion coefficient than the material, and maximum absorbance $H_2$ of the other material having the larger diffusion coefficient under the situation in which the electrochromic layer is in the colored state satisfy Formula $$1 \leq D_2\mathrm{max}/D_2\mathrm{min} \leq (1+0.146/H_2)^2 \tag{5}$$

2. The electrochromic device according to claim 1, wherein the diffusion coefficient $D_2$min is equal to the diffusion coefficient $D_2$max.

3. The electrochromic device according to claim 1, wherein the diffusion coefficient $D_2$min, the diffusion coefficient $D_2$max and the maximum absorbance $H_2$ satisfy Formula $$1 \leq D_2\mathrm{max}/D_2\mathrm{min} \leq (1+0.0792/H_2)^2 \tag{15}$$

4. The electrochromic device according to claim 1, wherein the diffusion coefficient $D_2$min and the diffusion coefficient $D_2$max satisfy Formula $$1 \leq D_2\mathrm{max}/D_2\mathrm{min} \leq 1.29 \tag{17}$$

5. The electrochromic device according to claim 4, wherein the diffusion coefficient $D_2$min and the diffusion coefficient $D_2$max satisfy Formula $$1 \leq D_2\mathrm{max}/D_2\mathrm{min} \leq 1.15 \tag{18}$$

6. The electrochromic device according to claim 1, wherein each of the different electrochromic materials having the same polarity is any of a monothiophene derivative, an oligothiophene derivative, an aromatic amine derivative, and a pyridine derivative.

7. The electrochromic device according to claim 1, wherein the distance between the pair of electrodes is in the range of 0.6 μm to 130 μm.

8. An optical filter comprising:
the electrochromic device according to claim 1; and
a transistor configured to control the electrochromic device.

9. A lens unit comprising:
the electrochromic device according to claim 1; and
a plurality of lenses.

10. An imaging apparatus comprising:
an optical imaging system;
an image sensor configured to receive light from the optical imaging system;
the electrochromic device according to claim 1; and
a transistor configured to control the electrochromic device, wherein
the electrochromic device is being disposed in an optical path of the light.

11. The electrochromic device according to claim 1, wherein the maximum absorbance of the material whose diffusion coefficient is $D_2$max is largest among the electrochromic materials in the electrochromic layer.

12. An electrochromic device comprising:
a pair of electrodes; and
an electrochromic layer disposed between the pair of electrodes and containing different electrochromic materials having the same polarity, the different electrochromic materials having the same polarity in the electrochromic layer including
three or more electrochromic materials,
wherein, in the case where three materials are selected from the different electrochromic materials having the same polarity in descending order of maximum absorbance under a situation in which the electrochromic layer is in a colored state, diffusion coefficients of the three materials are the same or are different from one another, and
wherein, in the case where the diffusion coefficient of the three materials are different from one another, a diffusion coefficient $D_3$min of a material that is among the three materials and has a smallest diffusion coefficient among the three materials, a diffusion coefficient $D_3$max of a material that is among the three materials and has a largest diffusion coefficient among the three materials, and maximum absorbance $H_3$ of the material having the largest diffusion coefficient under the situation in which the electrochromic layer is in the colored state satisfy Formula $$1 \leq D_3\mathrm{max}/D_3\mathrm{min} \leq (1+0.146/H_3)^2 \tag{5a}$$

13. The electrochromic device according to claim 12, wherein the diffusion coefficient $D_3$min is equal to the diffusion coefficient $D_3$max.

14. The electrochromic device according to claim 12, wherein the diffusion coefficient $D_3$min, the diffusion coefficient $D_3$max and the maximum absorbance $H_3$ satisfy Formula $$1 \leq D_3\mathrm{max}/D_3\mathrm{min} \leq (1+0.0792/H_3)^2 \tag{15a}$$

15. The electrochromic device according to claim 12, wherein diffusion coefficient $D_3$min and the diffusion coefficient $D_3$max satisfy Formula $$1 \leq D_3\mathrm{max}/D_3\mathrm{min} \leq 1.29 \tag{17a}$$

16. The electrochromic device according to claim 15, wherein the diffusion coefficient $D_3$min and the diffusion coefficient $D_3$max satisfy Formula $$1 \leq D_3\mathrm{max}/D_3\mathrm{min} \leq 1.15 \tag{18a}$$

17. The electrochromic device according to claim 12, wherein the maximum absorbance of the material whose diffusion coefficient is $D_3$max is largest among the electrochromic materials in the electrochromic layer.

18. An electrochromic device comprising:
a pair of electrodes; and
an electrochromic layer disposed between the pair of electrodes and containing different electrochromic materials having the same polarity,
wherein, in the case where two different materials, one of which being a material having largest maximum absorbance under a situation in which the electrochromic layer is in a colored state and the other of which being one of materials having maximum absorbance that is at least one-tenth of the maximum absorbance of the material having the largest maximum absorbance, are selected from the different electrochromic materials having the same polarity, diffusion coefficients of the two materials are the same or are different from each other and,
wherein, in a case where the diffusion coefficients of the two materials are different from, a diffusion coefficient $D_N$min of a material that is one of the two materials and has a smaller diffusion coefficient than the other material in the two materials, a diffusion coefficient $D_N$max of the other material that is in the two materials and has a larger diffusion coefficient than the material, and maximum absorbance $H_N$ of the other material having the larger diffusion coefficient under the situation in which the electrochromic layer is in the colored state satisfy Formula $$1 \leq D_N\text{max}/D_N\text{min} \leq (1+0.146/H_N)^2 \qquad (5b).$$

19. The electrochromic device according to claim 18, wherein the diffusion coefficient $D_N$min is equal to the diffusion coefficient $D_N$max.

20. The electrochromic device according to claim 18, wherein the diffusion coefficient $D_N$min, the diffusion coefficient $D_N$max and the maximum absorbance $H_N$ satisfy Formula $$1 \leq D_N\text{max}/D_N\text{min} \leq (1+0.0792/H_N)^2 \qquad (15b).$$

21. The electrochromic device according to claim 18, wherein the diffusion coefficient $D_N$min and the diffusion coefficient $D_N$max satisfy Formula $$1 \leq D_N\text{max}/D_N\text{min} \leq 1.29 \qquad (17b).$$

22. The electrochromic device according to claim 21, wherein the diffusion coefficient $D_N$min and the diffusion coefficient $D_N$max satisfy Formula $$1 \leq D_N\text{max}/D_N\text{min} \leq 1.15 \qquad (18b).$$

* * * * *